(12) United States Patent
Morita et al.

(10) Patent No.: US 7,876,666 B2
(45) Date of Patent: *Jan. 25, 2011

(54) WRITE-ONCE INFORMATION RECORDING MEDIUM AND COLORING MATTER MATERIAL THEREFOR

(75) Inventors: Seiji Morita, Yokohama (JP); Koji Takazawa, Tokyo (JP); Naoki Morishita, Yokohama (JP); Naomasa Nakamura, Yokohama (JP)

(73) Assignee: Kabushiki Kaisha Toshiba, Tokyo (JP)

(*) Notice: Subject to any disclaimer, the term of this patent is extended or adjusted under 35 U.S.C. 154(b) by 888 days.

This patent is subject to a terminal disclaimer.

(21) Appl. No.: 11/089,037

(22) Filed: Mar. 25, 2005

(65) Prior Publication Data

US 2005/0219997 A1 Oct. 6, 2005

(30) Foreign Application Priority Data

Apr. 2, 2004 (JP) ............................. 2004-110384
Mar. 18, 2005 (JP) ............................. 2005-079627

(51) Int. Cl.
*G11B 7/24* (2006.01)
(52) U.S. Cl. ................................. 369/275.4; 428/64.4
(58) Field of Classification Search ........................ None
See application file for complete search history.

(56) References Cited

U.S. PATENT DOCUMENTS

| | | | |
|---|---|---|---|
| 5,514,440 A | 5/1996 | Gotoh et al. | |
| 5,776,656 A | 7/1998 | Shinkai et al. | |
| 6,028,836 A * | 2/2000 | Kosuda et al. | 369/275.1 |
| 6,071,672 A | 6/2000 | Namba et al. | |
| 6,639,892 B2 * | 10/2003 | Usami | 369/275.4 |
| 6,723,410 B2 | 4/2004 | Ohno et al. | |
| 6,844,044 B2 | 1/2005 | Sabi | |
| 2002/0028918 A1* | 3/2002 | Kasada et al. | 534/693 |
| 2002/0034153 A1* | 3/2002 | Okubo et al. | 369/275.4 |
| 2002/0034605 A1 | 3/2002 | Matsui et al. | |
| 2002/0048646 A1* | 4/2002 | Tomura et al. | 428/64.4 |
| 2003/0113505 A1 | 6/2003 | Morishima | |
| 2003/0181727 A1* | 9/2003 | Kasada et al. | 548/159 |
| 2003/0210642 A1 | 11/2003 | Kuribayashi et al. | |
| 2004/0022162 A1* | 2/2004 | Endoh et al. | 369/109.01 |
| 2004/0096775 A1* | 5/2004 | Lehmann et al. | 430/276.1 |
| 2005/0141404 A1* | 6/2005 | Ootera et al. | 369/275.4 |
| 2005/0219995 A1* | 10/2005 | Morita et al. | 369/275.4 |
| 2005/0219996 A1* | 10/2005 | Morita et al. | 369/275.4 |
| 2006/0210925 A1* | 9/2006 | Ando et al. | 430/270.16 |

FOREIGN PATENT DOCUMENTS

| | | |
|---|---|---|
| EP | 0 353 007 | 1/1990 |
| EP | 1 369 861 A2 | 12/2003 |
| EP | 1484191 A1 | 12/2004 |
| JP | 2000-311384 | 11/2000 |
| JP | 2001-312838 | 11/2001 |
| JP | 2002-74740 | 3/2002 |
| JP | 2002-324320 | 11/2002 |
| JP | 2003-246148 * | 9/2003 |
| JP | 2003-257079 A | 9/2003 |
| JP | 2003-263778 | 9/2003 |
| JP | 2003-303442 | 10/2003 |
| JP | 2003-308630 | 10/2003 |
| JP | 2003-331465 | 11/2003 |
| JP | 2004-213753 | 7/2004 |
| JP | 2004-253096 A | 9/2004 |
| JP | 2004-296052 A | 10/2004 |
| JP | 2005-293772 | 10/2005 |
| JP | 2005-293773 | 10/2005 |
| TW | 130957 | 3/1990 |
| TW | 314621 | 9/1997 |
| TW | 570924 | 1/2004 |
| TW | 572969 | 1/2004 |
| TW | 575639 | 2/2004 |
| WO | WO 01/44374 | 6/2001 |
| WO | WO 01/74600 | 10/2001 |
| WO | WO 02/082438 A2 | 10/2002 |
| WO | WO 02/101735 | 12/2002 |

OTHER PUBLICATIONS

Translation JP-2003-246148(Sep. 2003).*
European Search Report dated Jul. 12, 2007for Appln. No. 05102522.9-1214.
European Search Report dated Mar. 3, 2006 for Appln. No. 05102522.9-2210.
Japanese Office Action dated Jul. 8, 2008 for Appln No. 2004-110384.
Japanese Office Action dated Jul. 8, 2008 for Appln. No. 2005-079627.
Taiwanese Office Action dated Aug. 20, 2008 for Appln. No. 94109640.
Japanese Office Action dated Nov. 4, 2009 for Appln. No. 2008-230044.
Japanese Office Action dated Jul. 14, 2009 for Appln No. 2004-110384.
Japanese Office Action dated Jul. 14, 2009for Appln. No. 2005-079627.

* cited by examiner

*Primary Examiner*—Martin J Angebranndt
*Assistant Examiner*—Anna L Verderame
(74) *Attorney, Agent, or Firm*—Pillsbury Winthrop Shaw Pittman, LLP

(57) ABSTRACT

A write-once information recording medium comprises a transparent resin substrate having a concentrically or spirally shaped groove and a land formed thereon, and a recording firm formed on the groove and the land of the transparent resin substrate, a recording mark being formed on the medium by emission of a short wavelength laser light, the recording medium having an L to H feature in which a light reflectivity of the recording mark portion formed by the emission of the short wavelength laser light is higher than a light reflectivity obtained before the emission of the short wavelength laser light.

2 Claims, 17 Drawing Sheets

|  | Molecule formula (molecular weight) | λ max (soluent) | Decomposition temperature (calorific value) |
|---|---|---|---|
| Coloring matter A | $C_{57}H_{59}CoN_{12}O_{10}$ (1131.10) | 577nm $\varepsilon = 1.0 \times 10^5$ (MeOH) | 286°C (730mJ/mg) |
| Coloring matter B | $C_{38}H_{32}N_{14}NiO_8$ (871.45) | 611nm $\varepsilon = 8.9 \times 10^4$ (MeOH) | 249°C (336mJ/mg) |
| Coloring matter C | $C_{55}H_{61}CoN_{10}O_8$ (1049.08) | 542nm $\varepsilon = 1.6 \times 10^5$ (MeOH) | 259°C (795mJ/mg) |
| Coloring matter D | $C_{57}H_{57}CoN_{12}O_{10}$ (1129.07) | 447nm $\varepsilon = 6.9 \times 10^4$ (MeOH) | 269°C (474mJ/mg) |

F I G. 1

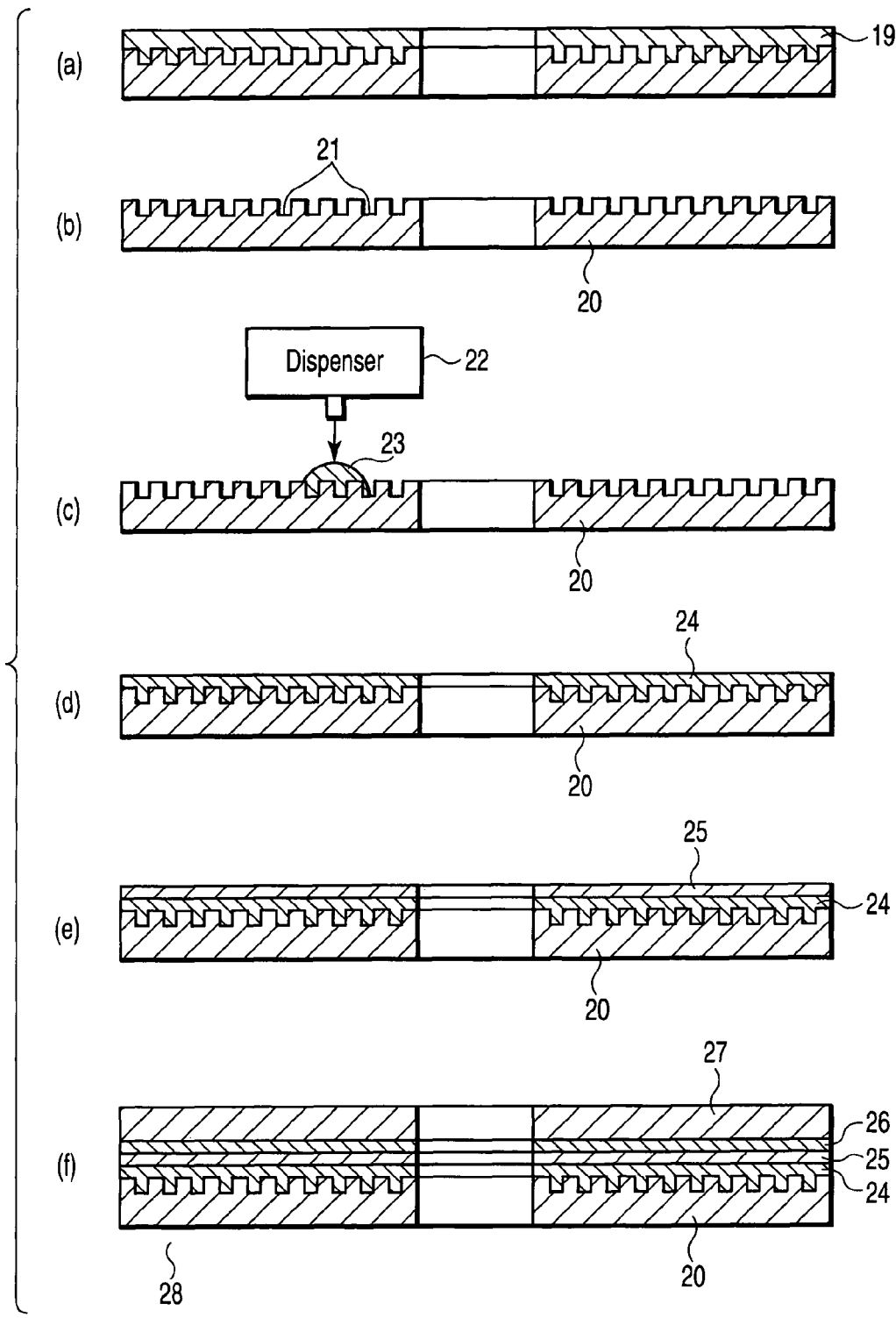
F I G. 6

(b)

| Coloring matter | CNR | PRSNR | SbER |
|---|---|---|---|
| A | 46.5 | 13.5 | $3.6 \times 10^{-6}$ |
| B | 42.1 | 5.3 | $5.7 \times 10^{-3}$ |
| C | 47.9 | 5.3 | $5.7 \times 10^{-3}$ |
| D | 53.1 | 28.1 | $1.1 \times 10^{-7}$ |
| F | 54.2 | 28.0 | $8.0 \times 10^{-8}$ |
| G | 55.4 | 20.5 | $1.5 \times 10^{-8}$ |
| H | 52.8 | 20.7 | $8.7 \times 10^{-7}$ |
| I | 54.5 | 28.0 | $8.0 \times 10^{-8}$ |
| J | 54.3 | 28.0 | $8.0 \times 10^{-8}$ |
| K | 54.6 | 28.2 | $7.0 \times 10^{-8}$ |
| L | 55.0 | 29.0 | $6.0 \times 10^{-8}$ |

| Coloring matter | PRSNR | SbER |
|---|---|---|
| D | 13.4 | $1.4 \times 10^{-5}$ |
| F | 14.8 | $2.5 \times 10^{-6}$ |
| G | 10.0 | $3.2 \times 10^{-5}$ |
| H | 15.0 | $6.4 \times 10^{-6}$ |
| I | 15.5 | $1.0 \times 10^{-6}$ |
| J | 16.0 | $8.0 \times 10^{-7}$ |
| K | 17.5 | $7.0 \times 10^{-7}$ |
| L | 19.0 | $5.0 \times 10^{-7}$ |

WRITE-ONCE INFORMATION RECORDING MEDIUM AND COLORING MATTER MATERIAL THEREFOR

CROSS-REFERENCE TO RELATED APPLICATIONS

This application is based upon and claims the benefit of priority from prior Japanese Patent Applications No. 2004-110384, filed Apr. 2, 2004; and No. 2005-079627, filed Mar. 18, 2005, the entire contents of both of which are incorporated herein by reference.

BACKGROUND OF THE INVENTION

1. Field of the Invention

The present invention relates to a write-once information recording medium capable of recording and reproducing information by using a short wavelength laser light such as, for example, a blue laser light, and a coloring matter material for the medium.

2. Description of the Related Art

As is well known, in recent years, a medium for storing digital data has been increasingly important with the prevalence of personal computers and the like. For example, at present, an information recording medium capable of digitally recording and reproducing video information and voice information for a long period has become prevalent. Also, an information recording medium for digital recording and reproduction has been used for mobile devices such as cellular phones.

Here, as an information recording medium of this type, a disk shaped one is frequently utilized for a variety of reasons: it has a large information recording capacity; it has a high random access performance capable of making a search for desired recorded information speedily; and moreover, it is small and light in weight, has excellent portability, and is inexpensive.

As such a disk shaped information recording medium, currently, there is mainly used: a so-called optical disk capable of recording and reproducing information in a non-contact manner by emitting a laser light. This optical disk primarily conforms to a compact disk (CD) standard or a digital versatile disk (DVD) standard, and has compatibility between both of these standards.

There are three types of optical disks: a reproduction only type which cannot record information such as CD-DA (digital audio), CD-ROM (read only memory), DVD-V (video), or DVD-ROM; a write-once which can write information only once such as CD-R (recordable) or DVD-R; and a rewritable type which can rewrite information many times such as CD-RW (rewritable) or DVD-RW.

Among them, as one capable of recording information, a write-once optical disk using an organic coloring matter for a recording layer is the most prevalent because of its low manufacturing cost. This is because, if an information recording capacity exceeds 700 megabytes (MB), there is almost no use of erasing recorded information and rewriting a new item of information, and eventually recording information only once will suffice.

In a write-once optical disk using an organic coloring matter for a recording layer, after a laser light has been emitted to a recording region (track) defined by a groove, when a resin substrate is heated at its glass transition point Tg or more, the organic coloring matter film in the groove undergoes photo-chemical reaction, and a negative pressure is generated. As a result, a recording mark is formed by utilizing the fact that the resin substrate is deformed in the groove.

A typical organic coloring matter used for CD-R in which a wavelength of a laser light for recording and reproduction is about 780 nm includes a phthalo cyanine based coloring matter such as IRGAPHOR Ultragreen MX available from Ciba Speciality Chemicals. In addition, a typical organic coloring matter used for DVD-R in which a wavelength of a laser light for recording and reproduction is about 650 nm includes an azo metal complex based coloring matter available from Mitsubishi Chemicals Medium Co., Ltd.

In the meantime, in a next generation optical disk which achieves higher density and higher performance recording and reproduction as compared with a current optical disk, a blue laser light having a wavelength of about 450 nm is used as a laser light for recording and reproduction. However, an organic coloring matter material capable of achieving practically sufficient recording and reproducing features by using such a light beam with a small wavelength has not been developed yet.

That is, in the current optical disk for carrying out recording and reproduction by using a infrared laser light or a red laser light, there is used: an organic coloring matter material having a large absorption extremity at a wavelength side which is shorter than a wavelength (780 or 650 nm) of laser light for recording and reproduction. In this manner, the current optical disk achieves a so-called H-to-L (high-to-low) feature wherein the light reflectivity of a recording mark portion formed by emitting a laser light is lower than that before emitting the laser light.

In contrast, in the case where recording and reproduction are carried out by using a blue laser light, there is a problem that: an organic coloring matter material having an absorption extremity on a wavelength side which is shorter than a wavelength (405 nm) of the laser light for recording and reproduction is poor in stability and preservation durability relevant to an ultraviolet ray or the like; is poor in stability relevant to a heat; and is low in contrast and resolution of the recording mark.

In addition, blurring of the recording mark is probe to increase, and thus, this blurring affects the adjacent tracks, and deterioration of the cross-write feature is likely to occur. Further, there occurs inconvenience that a recording sensitivity is lowered and that a sufficient reproduction signal S/N (Signal to Noise) ratio and a bit error rate cannot be obtained.

Under a condition in which no information is recorded in the adjacent tracks, there is a case in which a predetermined recording sensitivity can be obtained. However, if information is recorded in the adjacent tracks, a reproduction signal S/N ratio is lowered because a cross write into the adjacent track is large. In addition, a bit error rate is higher, and a level suitable to practical use is not reached.

In Jpn. Pat. Appln. KOKAI Publication No. 2002-74740, there is disclosed an optical recording medium in which an absorption extremity of an organic coloring matter compound included in a recording layer exists at a wavelength side which is longer than a wavelength of a write light beam. However, in this document, there is nowhere described a configuration of improving performance of an optical disk itself such as a change of a light reflectivity before and after emission of a laser light, a reproduction signal S/N ratio, or a bit error rate.

BRIEF SUMMARY OF THE INVENTION

According to one aspect of the present invention, there is provided a write-once information recording medium comprising: a transparent resin substrate having a concentrically or spirally shaped groove and a land formed thereon; and a recording firm formed on the groove and the land of the transparent resin substrate, a recording mark being formed on the medium by emission of a short wavelength laser light, wherein the light reflectivity of the recording mark portion formed by the emission of the short wavelength laser light is higher than the light reflectivity obtained before the emission of the short wavelength laser light.

According to another aspect of the present invention, there is provided an organic coloring matter material for a write-once information recording medium comprising: a transparent resin substrate having formed thereon a concentrically or spirally shaped groove and a land; a recording film formed on the groove and the land of the transparent resin substrate; and a metal reflection film formed on the recording film, the organic coloring matter material being used for the recording film of a write-once information recording medium on which a recording mark is formed by emission of a short wavelength laser light, wherein a light reflectivity of the recording mark portion formed by the emission of the short wavelength laser light is higher than a light reflectivity obtained before the emission of the short wavelength laser light.

BRIEF DESCRIPTION OF THE SEVERAL VIEWS OF THE DRAWING

FIG. 1 shows four examples of an organic coloring matter material included in a recording film according to one embodiment of the present invention;

FIG. 6 is a view for explaining a method for producing the write-once optical disk;

DETAILED DESCRIPTION OF THE INVENTION

Figure 2:
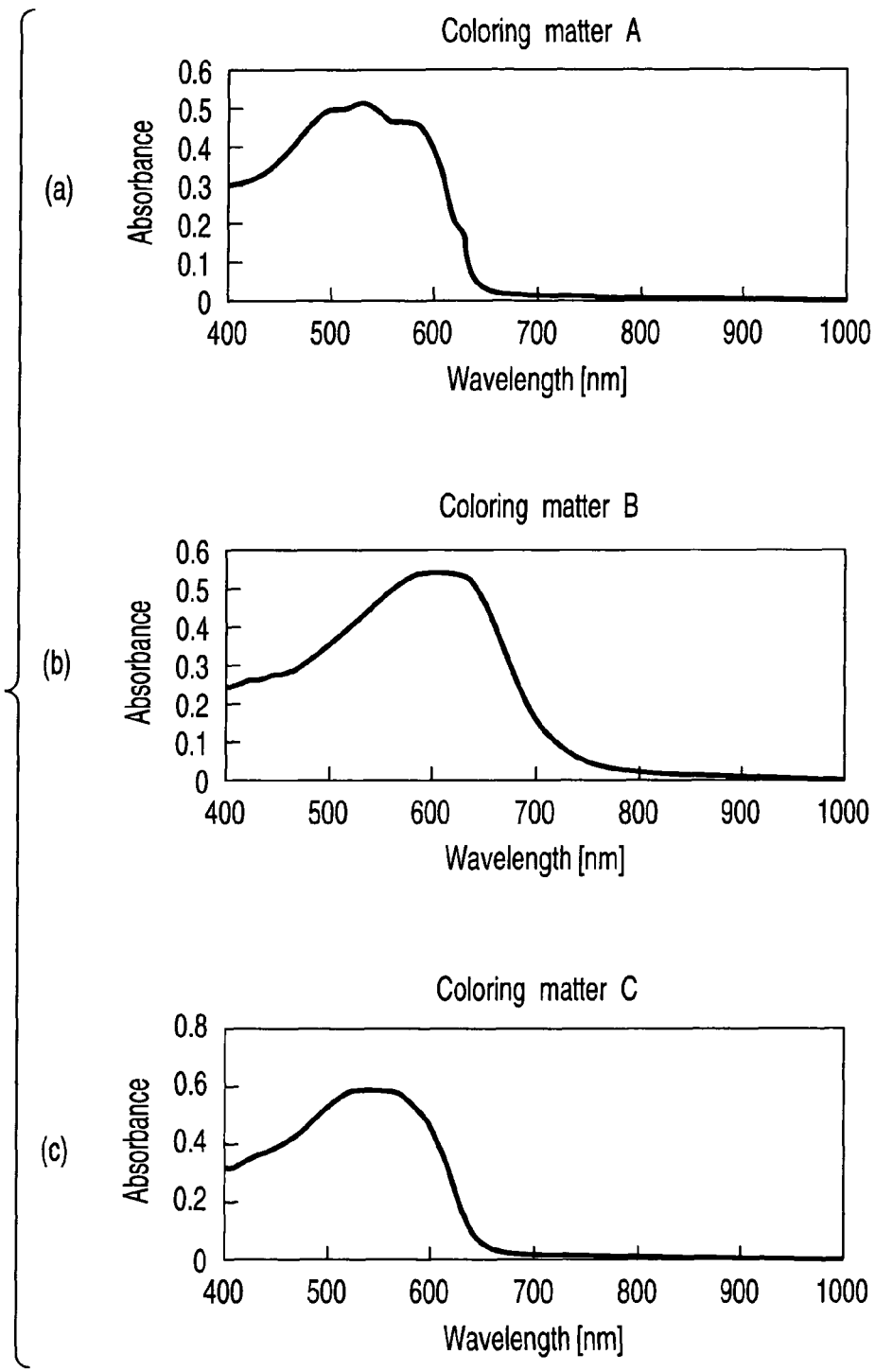
FIG. 2 is a characteristic view for explaining a change of a degree of light absorption relevant to a wavelength of a laser light with respect to three of the above four examples of the organic coloring matter material.

Hereinafter, one embodiment of the present invention will be described in detail with reference to the accompanying drawings. A write-once recording medium described in the embodiment comprises a transparent resin substrate formed of, for example, a synthetic resin material such as polycarbonate in a disk shape. On the transparent resin substrate, a groove is formed in a concentric shape or in a spiral shape. The transparent resin substrate can be manufactured by ejection molding using a stamper.

On the transparent resin substrate, a recording film including an organic coloring matter is formed so as to fill the groove. As the organic coloring matter which forms the recording film, there is used a coloring matter having its maximum absorption wavelength region which is shifted on a wavelength side which is longer than the recording wavelength (405 nm). Also, the recording wavelength region has been designed so as to have equivalent light absorption without erasure of the absorption.

In this manner, in the case where focusing or tracking is carried out on a track before recording information by a laser light for recording, a low light reflectivity is obtained. A coloring matter decomposition reaction is generated by the laser light, and the light absorption rate is lowered, whereby the light reflectivity of a recording mark portion increases. Thus, a so-called L-to-H feature is achieved such that the light reflectivity of the recording mark portion formed by emitting the laser light is higher than the light reflectivity obtained before emitting the laser light.

The transparent resin substrate, in particular, a groove bottom may be deformed due to heat generation. In this case, a phase difference may occur with the reflection light.

The above organic coloring matter is liquefied by dissolving it in a solvent, and the resulting solution can be easily coated onto a transparent resin substrate surface in accordance with a spin coat technique. In this case, film thickness can be managed with high precision by controlling the dilution rate by solvent and a rotation frequency during spin coating.

The organic coloring matter is composed of a coloring matter portion and an anion portion. As the coloring matter portion, a cyanine coloring matter, a styryl coloring matter or the like can be used. In particular, the cyanine coloring matter and styryl coloring matter are preferred because an absorption rate relevant to a recording wavelength can be easily controlled.

Among them, in a monomethine cyanine coloring matter having a monomethine chain, the recording film coated onto the transparent resin substrate is reduced in thickness, thereby making it possible to easily adjust absorbance in extreme absorption and a recording wavelength region (400 to 405 nm) in the range of 0.3 to 0.5, preferably to about 0.4. Thus, a recording and reproducing feature can be improved, and the light reflectivity and recording sensitivity can be well designed.

As the anion portion, an organic metal complex is preferably used in view of light stability. The metal complex has excellent light stability in particular when cobalt or nickel is used as a core metal.

An azo metal complex is most preferable. The decomposition property is also good in the case where 2, 2, 3, 3-tetrafluoro-1-1propanol (TFP) is used as a solvent, and a solution for spin coating can be easily produced. In addition, recycling can be carried out after spin coating, thus making it possible to reduce the manufacturing cost of the optical disk.

FIG. 1 shows four examples of coloring matters A to D as organic coloring matter materials. Coloring matter A has a coloring matter portion (cation moiety) made of a styryl coloring matter, and has an anion portion made of an azo metal complex 1. Coloring matter C has a coloring matter portion (cation moiety) made of a styryl coloring matter, and has an anion portion made of an azo metal complex 2. Coloring matter D has a coloring matter portion (cation moiety) made of a monomethine cyanine coloring matter, and has an anion portion made of an azo metal complex 1. A simplex of the organic metal complex can also be used. For example, coloring matter B is a nickel complex coloring matter.

Then, on a disk substrate coated with the organic coloring matter thin film obtained after the above spin coating, a coloring matter is dried at a temperature of about 80° C. by using a hot plate or a clean oven. Then, on the thin film, a metal thin film serving as a light reflection film is formed by sputtering. As a material for the metal reflection film, for example, Au, Ag, Cu, Al or their alloy is used.

Then, an ultraviolet ray curable resin is spin-coated onto the metal film, and a protection disk substrate is attached to the film, whereby a write-once optical disk is manufactured as a write-once information recording medium.

Here, general formula 1 represents a general formula of a styryl coloring matter serving as each of the coloring matter moieties of coloring matters A and C described above. General formula 2 represents a general formula of an azo metal complex serving as each of the anion moieties of coloring matters A and C. In addition, general formula 3 represents a general formula of a monomethine cyanine coloring matter serving as the coloring matter portion of coloring matter D described above, and general formula 4 represents a general formula of an azo metal complex serving as the anion portion of coloring matter D.

general formula 1:

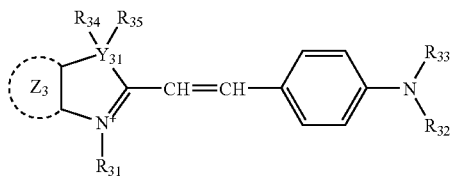

general formula 2:

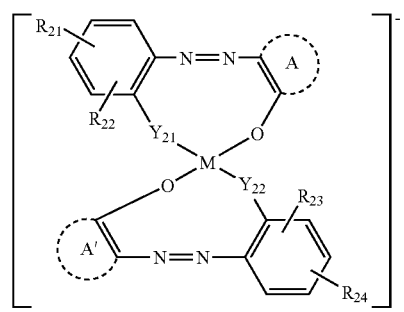

general formula 3:

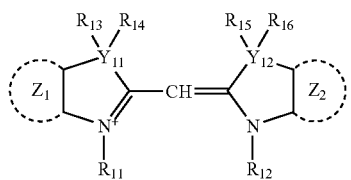

general formula 4:

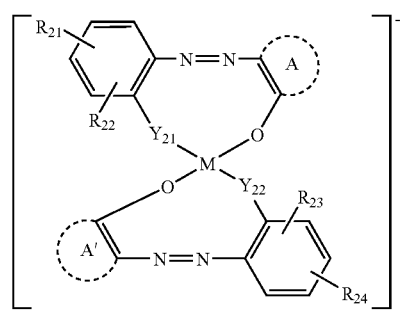

In the above general formula of the styryl coloring matter, $Z3$ represents an aromatic ring, and the aromatic ring may have a substituent. $Y31$ represents a carbon atom or a hetero atom. $R31$, $R32$, and $R33$ represent mutually same or different aliphatic hydrocarbon groups. These aliphatic hydrocarbon groups each may have a substituent. $R34$ and $R35$ each represent a hydrogen atom or a proper substituent, independently. when $Y31$ is a hetero atom, either or both of $R34$ and $R35$ are absent.

In addition, in the general formula of the monomethine cyanine coloring matter, $Z1$ and $Z2$ represent mutually same or different aromatic rings, and these aromatic rings each may have a substituent. $Y11$ and $Y12$ each represent a carbon atom or a hetero atom, independently. $R11$ and $R12$ represent aliphatic hydrocarbon groups, and these aliphatic hydrocarbon groups each may have a substituent. $R13$, $R14$, $R15$, and $R16$ each represent a hydrogen atom or a proper substituent, independently. When $Y11$ and $Y12$ are hetero atoms, part or all of $R13$, $R14$, $R15$, and $R16$ are absent.

The monomethine cyanine coloring matter used in the embodiment is any one of mutually same or different coloring matter having one or more substituents at both ends of the monomethine chain possibly having one or more substituents, including coloring matters coupled with ring nucleus such as an imidazoline ring, an imidazole ring, a benzimidazole ring, an alpha-naphthoimidazole ring, a beta-naphthoimidazole ring, an indole ring, an isoindole ring, an indolinyl ring, an isoindolinyl ring, a benzoindolinyl ring, a pyridinoindolinyl ring, an oxazoline ring, an oxazole ring, an iso-oxazole ring, a benzo-oxazole ring, a pyridino-oxazole ring, an alpha-naphtho-oxazole ring, a beta-naphtho-oxazole ring, a selenazoline ring, a selenazole ring, a benzoselenazole ring, an alpha-naphthoselenazole ring, a beta-naphthoselenazole ring, a thiazoline ring, a thiazole ring, an isothiazole ring, a benzothiazole ring, an alpha-naphthothiazole ring, a beta-naphthothiazole ring, a tellurazoline ring, a tellurazole ring, a benzotellurazole ring, an alpha-naphthotellurazole ring, a beta-naphthotellurazole ring, and further, an acrylidine ring, an anthracene ring, an isoquinoline ring, an isopyrrole ring, an imidanoxaline ring, an indandione ring, an indazole ring, an indoline ring, an oxadiazole ring, a carbazole ring, a xanthene ring, a xanazoline ring, a quinoxaline ring, a quinoline ring, a chromane ring, a cyclohexanedione ring, a cyclopenetanedione ring, a cinnoline ring, a thiodiazole ring, a thiooxazolidone ring, a thiophene ring, a thionaphthene ring, a thiobarbituric acid ring, a thiohydantoin ring, a tetrazole ring, a triazine ring, a naphthalene ring, a naphthyridine ring, a piperazine ring, a pyrazine ring, a pyrazole ring, a pyrazoline ring, a pyrazolidine ring, a pyrazolone ring, a pyrane ring, a pyridine ring, a pyridazine ring, a pyrimidine ring, a pyrylium ring, a pyrrolidine ring, a pyrophosphate ring, a pyrrole ring, a phenadine ring, a phenanthridine ring, a phenanthrene ring, a phenanthrophosphate ring, a phthalazine ring, a pteridine ring, a furazane ring, a furan ring, a purin ring, a benzene ring, a benzo-oxazine ring, a benzopyrane ring, a morpholine ring and a rhodanine ring.

In the general formulas of the monomethine cyanine coloring matter and styryl coloring matter, Z1 to Z3 represent, for example, aromatic rings such as a benzene ring, a naphthalene ring, a pyridine ring, a quinoline ring, and a quinoxaline ring, and these aromatic rings may have one or plural substituents. Examples of the substituents include aliphatic hydrocarbon groups such as a methyl group, a trifluoromethyl group, an ethyl group, a propyl group, an isopropyl group, a butyl group, an isobutyl group, a sec-butyl group, a tert-butyl group, a pentyl group, an isopentyl group, a neopentyl group, a tert-pentyl group, a 1-methyl pentyl group, a 2-methyl pentyl group, a hexyl group, an isohexyl group, a 5-methyl hexyl group, a heptyl group and an octyl group; alicyclic hydrocarbon groups such as a cyclopropyl group, a cyclobutyl group, a cyclopentyl group and a cyclohexyl group; aromatic hydrocarbon groups such as a phenyl group, a biphenylyl group, an o-tolyl group, an m-tolyl group, a p-tolyl group, a xylyl group, a methycyl group, an o-cumenyl group, an m-cumenyl group and a p-cumenyl group; ether groups such as a methoxy group, a trifluoromethoxy group, an ethoxy group, a propoxy group, an isopropoxy group, a butoxy group, a sec-butoxy group, a tert-butoxy group, a pentyloxy group, a phenoxy group and a benzoyloxy group; ester groups such as a methoxycarbonyl group, a trifluoromethoxy carbonyl group, an ethoxycarbonyl group, a propoxycarbonyl group, an acetoxy group and a benzoyl oxy group; halogen groups such as a fluoro group, a chloro group, a bromo group and an iodo group; thio groups such as a methylthio group, an ehtylthio group, a propylthio group, a butylthio group and a phenylthio group; sulfamoyl groups such as a methyl sulfamoyl group, a dimethyl sulfamoyl group, an ethyl sulfamoyl group, a diethyl sufamoyl group, a propyl sulfamoyl group, a dipropyl sulfamoyl group, a butyl sulfamoyl group and a dibutyl sulfamoyl group; amino groups such as a primary amino group, a methylamino group, a dimethylamino group, an ethylamino group, a diethylamino group, a propylamino group, a dipropylamino group, an isopropylamino group, a diisopropylamino group, a butylamino group, a dibutylamino group and a piperidino group; carbamoyl groups such as a methyl carbamoyl group, a dimethyl carbamoyl group, an ethyl carbamoyl group, a diethyl carbamoyl group, a propyl carbamoyl group and a dipropyl carbamoyl group; and further, a hydroxyl group, a carboxy group, a cyano group, a nitro group, a sulfino group, a sulfo group, a mesyl group, etc. In general formula 3, Z1 and Z2 may be either mutually same or different.

In the general formulas of the monomethine cyanine coloring matter and styryl coloring matter, Y11, Y12, and Y31 represent carbon atoms or hetero atoms. The hetero atoms include a nitrogen atom, an oxygen atom, a sulfur atom, a selenium atom, and a tellurium atom, and other atoms selected from the elements of groups XV and XVI in the periodic table. The carbon atom in Y11, Y12, and Y31 may be an atomic group mainly comprising two carbon atoms such as an ethylene group and a vinylene group. In the general formula of the monomethine cyanine coloring matter, Y11 and Y12 may be either mutually same or different.

In the general formulas of the monomethine cyanine coloring matter and styryl coloring matter, R11, R12, R13, R32, and R33 represent aliphatic hydrocarbon groups. Examples of the aliphatic hydrocarbon groups include a methyl group, an ethyl group, a propyl group, an isopropyl group, an isopropenyl group, a 1-propenyl group, a 2-propenyl group, a butyl group, an isobutyl group, a sec-butyl group, a tert-butyl group, a 2-butenyl group, a 1,3-butadienyl group, a pentyl group, an isopentyl group, a neopentyl group, a tert-pentyl group, a 1-methylpentyl group, a 2-methylpentyl group, a 2-pentenyl group, a hexyl group, an isohexyl group, a 5-methylhexyl group, a peptyl group, an octyl group, and others. These aliphatic hydrocarbon groups may have one or plural substituents same as in Z1 to Z3.

Incidentally, R11 and R12 in the general formula of the monomethine cyanine coloring matter, and R12, R32, and R33 in the general formula of the styryl coloring matter may be either mutually same or different.

In the general formulas of the monomethine cyanine coloring matter and styryl coloring matter, R13 to R16, R34, and R35 represent hydrogen atoms or proper substituents, independently in the individual formulas. Examples of the substituents include aliphatic hydrocarbon groups such as a methyl group, a trifluoromethyl group, an ethyl group, a propyl group, an isopropyl group, a butyl group, an isobutyl group, a sec-butyl group, a tert-butyl group, a pentyl group, an isopentyl group, a neopentyl group, a tert-pentyl group, a 1-methyl pentyl group, a 2-methyl pentyl group, a hexyl group, an isohexyl group, a 5-methyl hexyl group, a heptyl group and an octyl group; ether groups such as a methoxy group, a trifluoromethoxy group, an ethoxy group, a propoxy group, a butoxy group, a tert-butoxy group, a pentyloxy group, a phenoxy group and a benzoyloxy group; halogen groups such as a fluoro group, a chloro group, a bromo group and an iodo group; and further, a hydroxy group, a carboxy group, a cyano group, and a nitro group. In the general formulas of the monomethine cyanine coloring matter and styryl coloring matter, if Y11, Y12, and Y31 are hetero atoms, part or all of R13 to R16 in Z1 and Z2, and part or all of R34 and R35 in Z3 are absent.

In the general formula of the azo metal complex, A and A' represent mutually same or different complex ring groups of five rings to ten rings, containing one or more hetero atoms selected from a nitrogen atom, an oxygen atom, a sulfur atom, a selenium atom, and a tellurium atom, such as a furyl group, a thienyl group, a pyridyl group, a piperidino group, a piperidyl group, a quinolyl group, and an iso-oxazolyl group. The complex ring group has one or more substituents, such as aliphatic hydrocarbon groups such as a methyl group, a trifluoromethyl group, an ethyl group, a propyl group, an isopropyl group, a butyl group, an isobutyl group, a sec-butyl group, a tert-butyl group, a pentyl group, an isopentyl group, a neopentyl group, a tert-pentyl group, a 1-methyl pentyl group, a 2-methyl pentyl group, a hexyl group, an isohexyl group and a 5-methyl hexyl group; ester groups such as a methoxycarbonyl group, a trifluoromethoxy carbonyl group, an ethoxycarbonyl group, a propoxycarbonyl group, an acetoxy group, a trifluoroacetoxy group and a benzoyl oxy group; aromatic hydrocarbon groups such as a phenyl group, a biphenylyl group, an o-tolyl group, a m-tolyl group, a p-tolyl group, an o-cumenyl group, an m-cumenyl group, a p-cumenyl group, a xylyl group, a mesityl group, a styryl group, a cinnamoyl group and a naphtyl group; and further, a carboxy group, a hydroxy group, a cyano group, and a nitro group.

The azo compound composing the azo organic metal oxide expressed in the general formula is prepared by ordinary method, by reaction between a diazonium salt having R21, R22, or R23, R24 corresponding to the general formula, and a complex ring compound having an active methylene group adjacent to a carboxyl group in the molecule, for example, an iso-oxazolone compound, an oxazolone compound, a thionaphthene compound, a pyrazolone compound, a barbituric acid compound, a hydantoin compound, and a rhodanine compound. Y21 and Y22 are mutually same or different hetero atoms selected from the elements of group XVI in the periodic table, such as an oxygen atom, a sulfur atom, a selenium atom, and a tellurium atom.

The azo metal complex expressed in the general formula is used in a form of metal complex, usually one or a plurality being coordinated in the metal (central atom). Examples of the metal element as a central atom include scandium, yttrium, titanium, zirconium, hafnium, panadium, niobium, tantalum, chromium, molybdenum, tungsten, manganese, technetium, rhenium, iron, lutenium, osmium, cobalt, rhodium, iridium, nickel, palladium, platinum, copper, silver, gold, zinc, cadmium, and mercury, and cobalt is most preferable.

Reference numeral (a) of FIG. 2 shows a change of absorbance of the emitted laser light relevant to a wavelength in the above coloring matter A. Reference numeral (b) of FIG. 2 shows a change of absorbance of the emitted laser light relevant to a wavelength in the above coloring matter B. Reference numeral (c) of FIG. 2 shows a change of absorbance of the emitted laser light relevant to a wavelength in the above coloring matter C.

Figure 3:
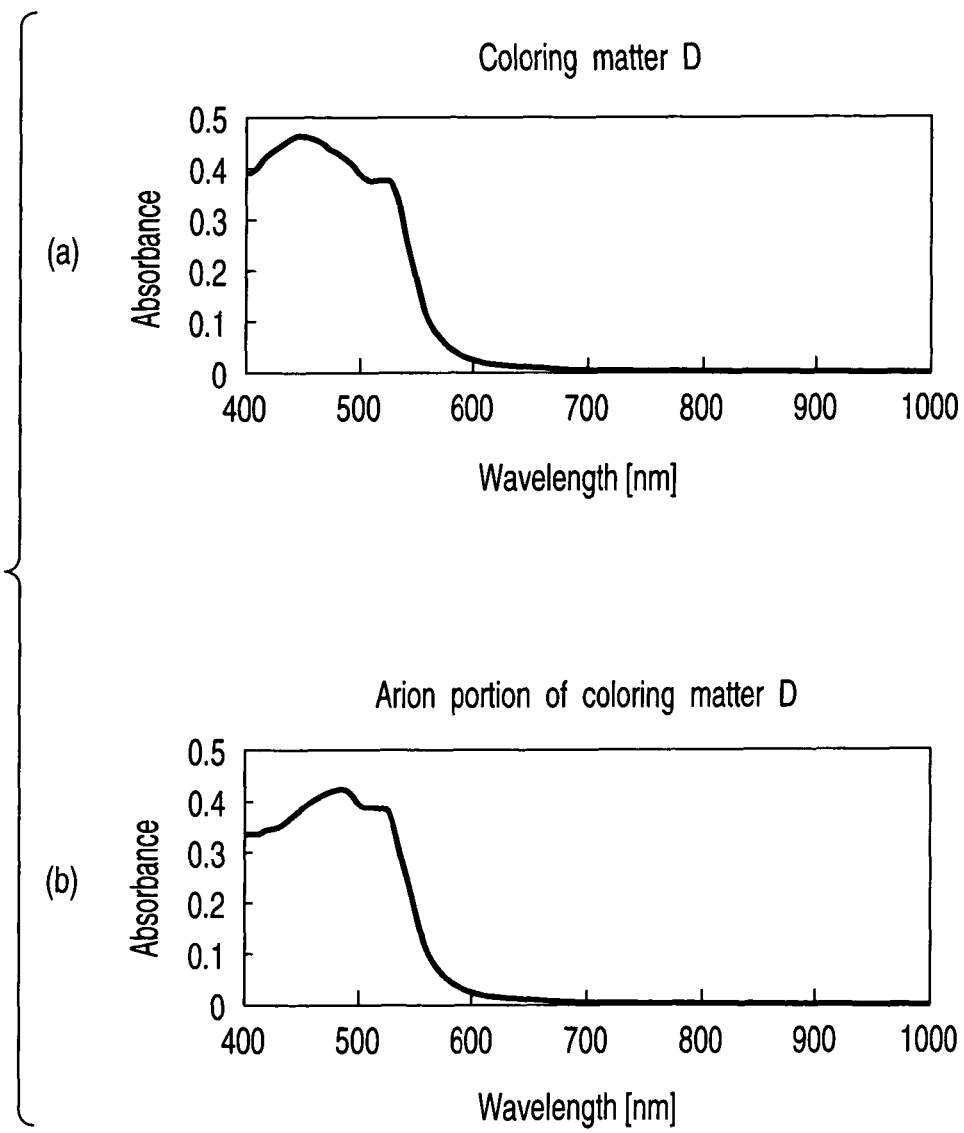
FIG. 3 is a characteristic view for explaining a change of a degree of light absorption relevant to a wavelength of a laser light with respect to the remaining one of the organic coloring matter material.

In addition, reference numeral (a) of FIG. 3 shows a change of absorbance of the laser light relevant to a wavelength in the above coloring matter D. Reference numeral (b) of FIG. 3 shows a change of absorbance of the emitted laser light relevant to a wavelength in the anion portion of the above coloring matter D.

As is evident from the features shown in FIG. 2 and FIG. 3, in the coloring matters A to D, their maximum absorption wavelength regions are shifted to a wavelength side which is longer than the recording wavelength (405 nm). A write-once optical disk described in the present embodiment is configured so as to have a so-called L-to-H feature in which organic coloring matters having the above-described features are included in a recording film and the light reflectivity obtained after emission of the laser light is higher than that obtained before emission of the laser light. In this manner, even if a short-wavelength laser light such as a blue light laser light is used, it is possible to record and reproduce information with performance which is excellent in terms of preservation durability, a reproduction signal S/N ratio, a bit error rate and the like and which is sufficiently suitable to practical use at a high density.

That is, in this write-once optical disk, an extreme absorption wavelength of the recording film including the organic coloring matter is situated on a wavelength side which is longer than the wavelength of a laser light for recording. Thus, the absorption of a short wavelength light beam such as ultraviolet ray can be reduced to the minimum, thus resulting in excellent light stability and improved reliability of information recording and reproduction.

In addition, the light reflectivity is low at the time of information recording, and thus, no cross light due to reflection scattering occurs. Therefore, even in a state in which information has been recorded in the adjacent tracks, the lowering of the reproduction signal S/N ratio or the bit error rate can be restricted. Further, the contrast and resolution of the recording mark can be maintained with a high quality relevant to heat generation, and a recording sensitivity design can be easily made.

In order to obtain a good L to H feature, it is desirable that the absorbance in recording wavelength (405 nm) is 0.3 or more. More preferably, the absorbance is 0.4 or more.

Here, in the groove serving as the recording and reproduction track of the write-once optical disk, its shape has a great effect on the recording and reproduction features. As a result of an utmost research of the Inventors, in particular, it was found out that the relationship between a groove width and a land width is important.

That is, the groove width is equal to the land width or if the groove width is smaller than the land width, it was found that the reproduction signal S/N ratio and bit error rate of the recorded information are prone to lower. Namely, it was found that good recording and reproduction features could be obtained when the groove width is larger than the land width.

In general, in order to record information in a write enable optical disk, it is necessary to record in advance a variety of address information such as a track number, a sector number, a segment number, and an error check and correction (ECC) block address number in an optical disk.

Means for recording such address information can be achieved by wobbling the groove in a radial direction of the optical disk. That is, the recording of the address information due to wobbling can be achieved by: means for modulating a wobble frequency in association with the address information; means for modulating a wobble amplitude in association with the address information; means for modulating a wobble phase in association with the address information; and means for modulating a polarity inversion interval of a wobble in association with the address information. In addition, means for utilizing a change of a land height as well as the wobble group, namely, means for embedding a pre-pit in the land can also be used.

Also, it was found out that the wobble amplitude, groove depth and the like, of such a groove have a great effect on the recording and reproduction features.

Now, a more specific description will be given below. First, a disk stamper for a high density R disk is prepared in accordance with the following procedures. That is, as shown in reference numeral (a) of FIG. 4, a semiconductor manufacturing silicon wafer 11 formed in a disk shape of a diameter of 200 nm and thickness of 0.725 mm is prepared.

The silicon wafer 11 is impregnated for 5 minutes in a mixture solution of a heated condensed sulfuric acid and a hydroperoxide water (liquid temperature of 100° C.). Next, the silicon wafer 11 is rinsed by impregnating it in ultra pure water, and is washed in an ultrasonic wave manner. Then, the wafer is impregnated in a 70° C. ultra pure water tank, and is dried by gradually pulling it up.

Figure 4:
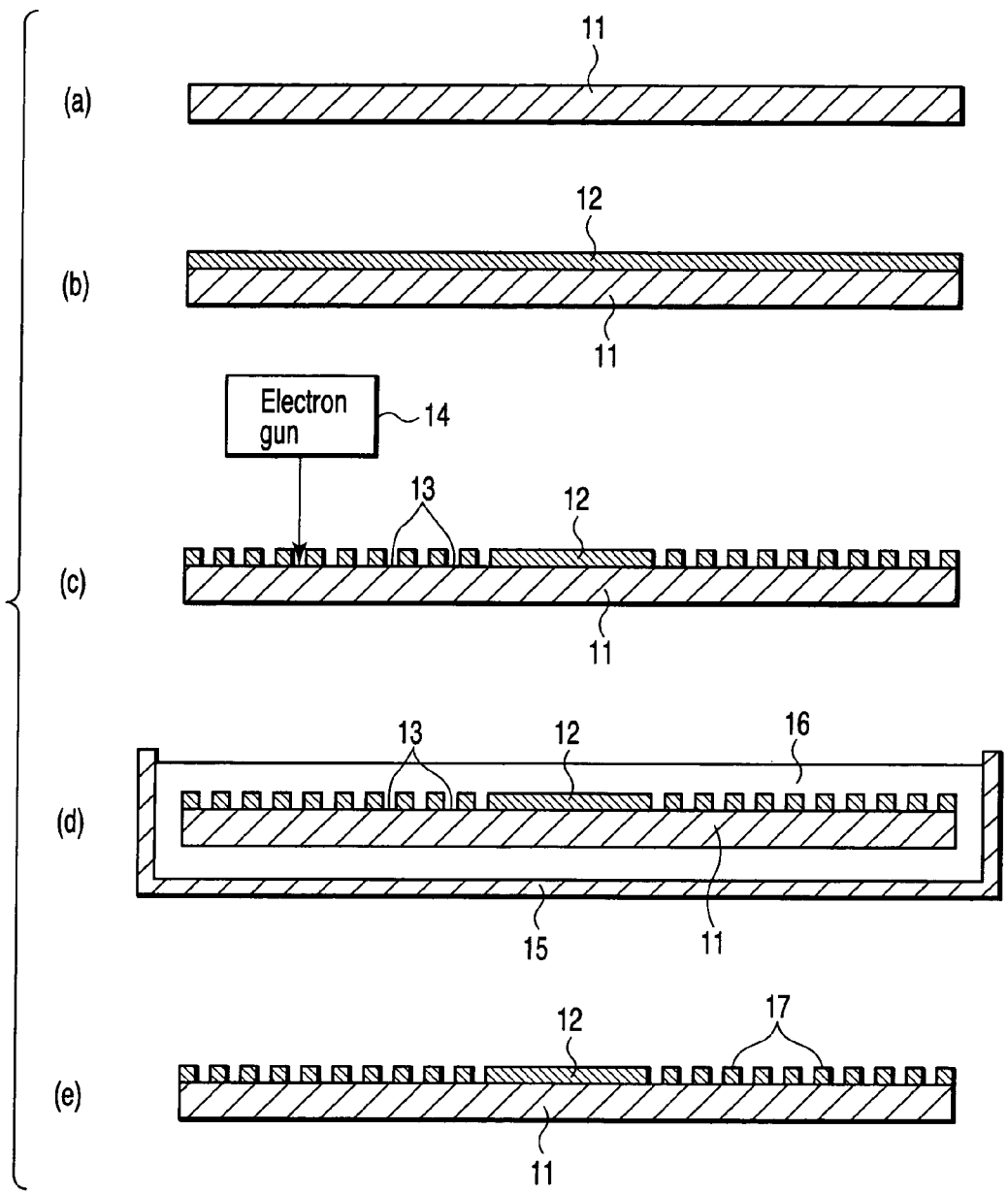
FIG. 4 is a view for explaining a part of a method of producing a disk stamper for producing a write-once optical disk in the embodiment.

Then, as shown in reference numeral (b) of FIG. 4, an electron beam resist film 12 is formed on a surface of the silicon wafer 11. The electron beam resist film 12 is formed by spin coating on the surface of the silicon wafer 11 a resist solution obtained by mixing and stirring an electron beam resist (ZEP520A7 available from Nihon Zeon Co., Ltd.) relevant to 100% by weight of an anizole solvent (ZEP-A available from Nihon Zeon Co., Ltd.).

Under the spin coating condition, the silicon wafer 11 is vacuum chucked on a spin table, the resist solution 12 is suspended via a 0.1-micron filter at the center of the silicon wafer 11 while rotation of the spin table stops, and then, the spin table is rotated at 2500 rpm.

Then, as shown in reference numeral (c) of FIG. 4, a groove 13 is formed in the electron beam resist film 12. This is accomplished by: placing the silicon wafer 11 coated with the electron beam resist film 12 in a vacuum vessel of an electron beam cutting machine; evaluating it in order of $10^{-5}$ Pa; rotating the silicon wafer 11: emitting an electron beam from an electron run 14 to the electron beam resist film 12; and recording a concentrically or spirally shaped groove pattern as an electron beam.

A groove pattern recording condition is such that an electron beam acceleration voltage is 50 kV, a beam current is 120 mA, a beam diameter is 110 nm, and a recording beam velocity is 1.1 m/sec. In addition, a recording region of the groove 13 is such that a radius of the silicon wafer 11 is in the range of 23 mm to 59 mm.

Then, the silicon wafer 11 obtained after the groove 13 has been recorded is taken out from the vacuum vessel of the electron beam cutting machine. As shown in reference numeral (d) of FIG. 4, the taken-out wafer 11 is impregnated in an organic developing liquid 16 contained in an impregnation vessel 15, and dip development is carried out, thereby forming a resist pattern of the groove 13.

Next, as shown in reference numeral (e) of FIG. 4, DC sputtering of an Ni film is carried out, thereby forming an Ni thin film 17 so as to be electrically conductive on the above-described resist pattern surface.

Figure 5:
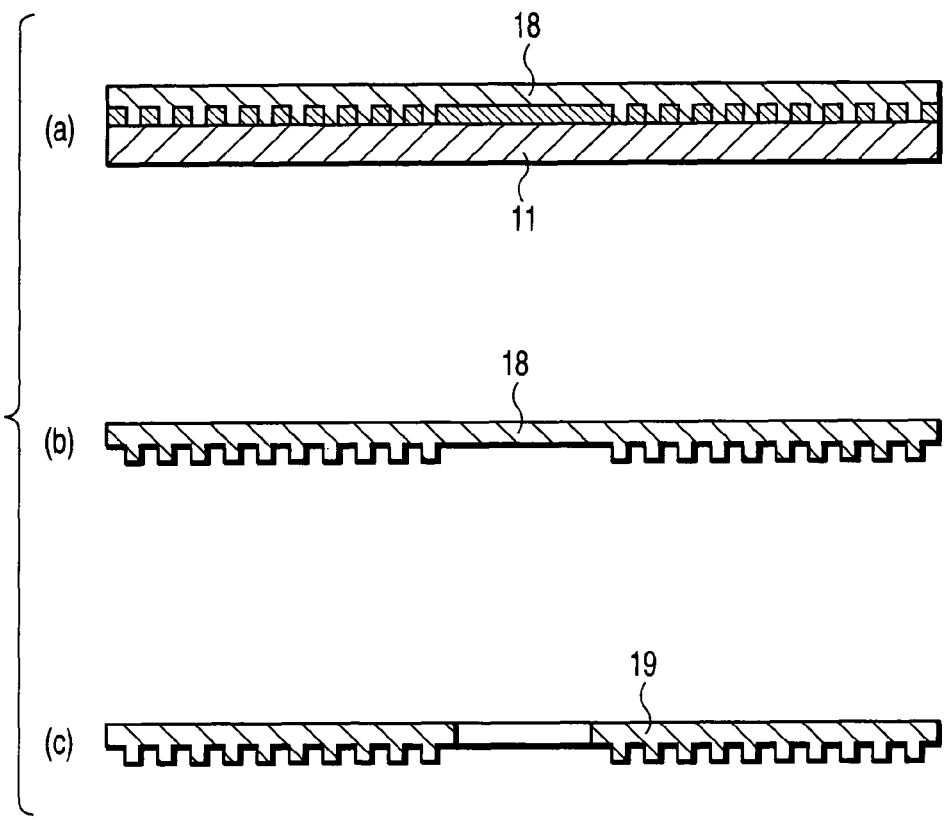
FIG. 5 is a view for explaining the remaining part of the method for producing the disk stamper.

Thereafter, as shown in reference numeral (a) of FIG. 5, Ni electro-forming is carried out on the Ni thin film 17 to form an Ni electro-formed metal layer 18 having thickness of 247 microns. As shown in reference numeral (b) of FIG. 5, after the Ni electro-formed metal layer 18 has been released and spin washed, the residual resist on the surface is released by oxygen RIE. Then, as shown in reference numeral (c) of FIG. 5, a protection film is coated on the Ni electro-formed metal layer 18, the back face side is polished, an internal diameter and an external diameter are processed, and a disk stamper 19 is produced.

Next, a write-once disk is produced by using the disk stamper 19. That is, as shown in reference numeral (a) of FIG. 6, by using the disk stamper 19, as shown in reference numeral (b) of FIG. 6, a transparent disk substrate 20 made of polycarbonate having thickness of 0.6 mm is duplicated by carrying out ejection molding with an ejection molding device SD40 available from Sumitomo Heavy Industry Co., Ltd. A groove 21, of course, is formed on the disk substrate 20.

Then, as shown in reference numeral (c) of FIG. 6, by using a dispenser 22 having a nozzle diameter of 21G, an organic coloring matter solution 23 described later, obtained by dissolving an organic coloring matter in a solvent is suspended on a face of the disk substrate 20 having the groove 21 formed thereon. Next, the disk substrate 20 is rotationally controlled, whereby, as shown in reference numeral (d) of FIG. 6, the organic coloring matter solution 23 is filled in the groove 21, and a recording film 24 is formed.

Figure 7:
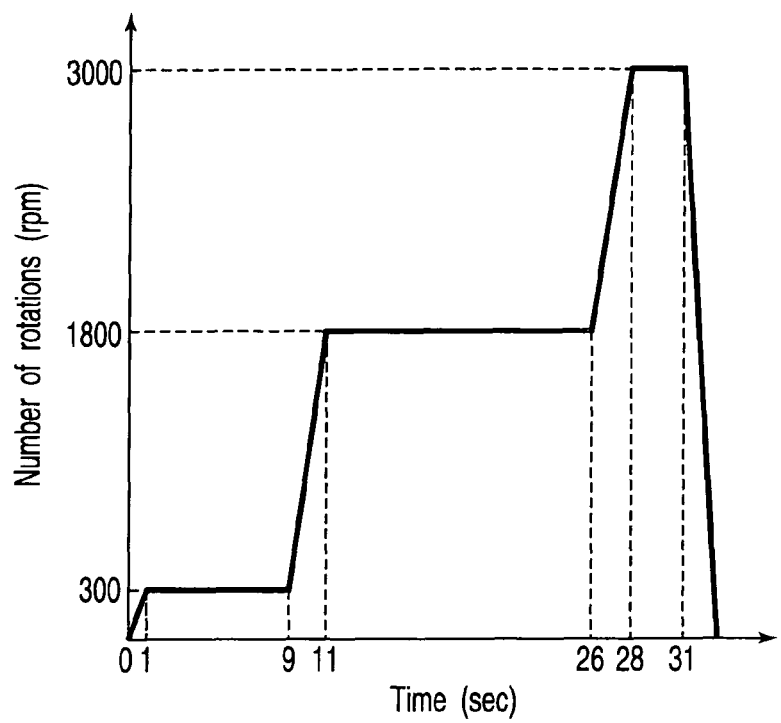
FIG. 7 is a view for explaining a spin coat condition for an organic coloring matter solution in the method for producing the additional type optical disk.

Under a spin coating condition for the recording film 24, as shown in FIG. 7, first, the disk substrate 20 is driven to rotate from its deactivated state up to 300 rpm within 1 second. While the disk substrate is maintained in this state for 8 seconds, the organic coloring matter solution 23 is coated by the dispenser 22. Subsequently, the rotation frequency of the disk substrate 20 is increased to 1800 rpm within 2 seconds, and the disk substrate is maintained in this state for 15 seconds. Then, the rotation frequency of the disk substrate 20 is increased to 3000 rpm within 2 seconds, and the disk substrate is maintained in this state for 3 seconds.

The film thickness of the recording film 24 can be controlled by controlling the rotation frequency at a second stage. That is, the film thickness of the recording film 24 can be increased by reducing the rotation frequency at the second stage.

Next, the disk substrate 20 coated with the recording film 24 is baked at 80° C. for 30 minutes by using a clean oven, and as shown in reference numeral (e) of FIG. 6, a 100 nm metal film 25 is sputtered on the recording film 24. As the metal film 25, although an Ag alloy containing 1% of AgND and 1% of Cu is used, pure silver can also be used.

Thereafter, as shown in reference numeral (f) of FIG. 6, an ultraviolet ray curable resin 26 is spin coated on the metal film 25, and a disk substrate 27 made of polycarbonate having thickness of 0.6 mm is attached, whereby a write-once optical disk (R disk) 28 including an organic coloring matter in the recording film 24 is produced.

Figure 8:
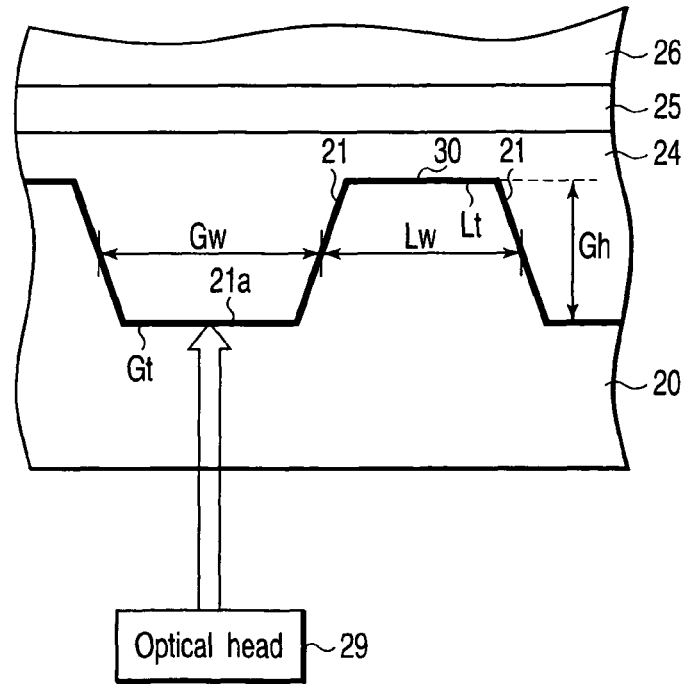
FIG. 8 is a view for explaining a relationship between a groove and a land in the write-once optical disk.

In the write-once optical disk 28 produced as described above, as shown in FIG. 8, a laser light for recording and reproduction by an optical head 29 is made incident from a face opposite to a face coated with the recording film 24 of the disk substrate 20.

In this case, a bottom face 21a of the groove 20 formed on the disk substrate 20 and a land 30 sandwiched between the adjacent grooves 21 are obtained as tracks for recording information. A recording track formed by the bottom face 20a of the groove 21a is referred to as a groove track Gt, and a recording track formed by the land 30 is referred to as a land track Lt.

A difference in height of the groove track Gt face relevant to the land track Lt face is referred to as a groove depth Gh. Further, a width of the groove track Gt seen at a height which is substantially ½ of the groove depth Gh is referred to as a groove width Gw, and a width of the land track Lt seen at a height which is substantially ½ of the groove depth Gh is referred to as a land width Lw.

Figure 9:
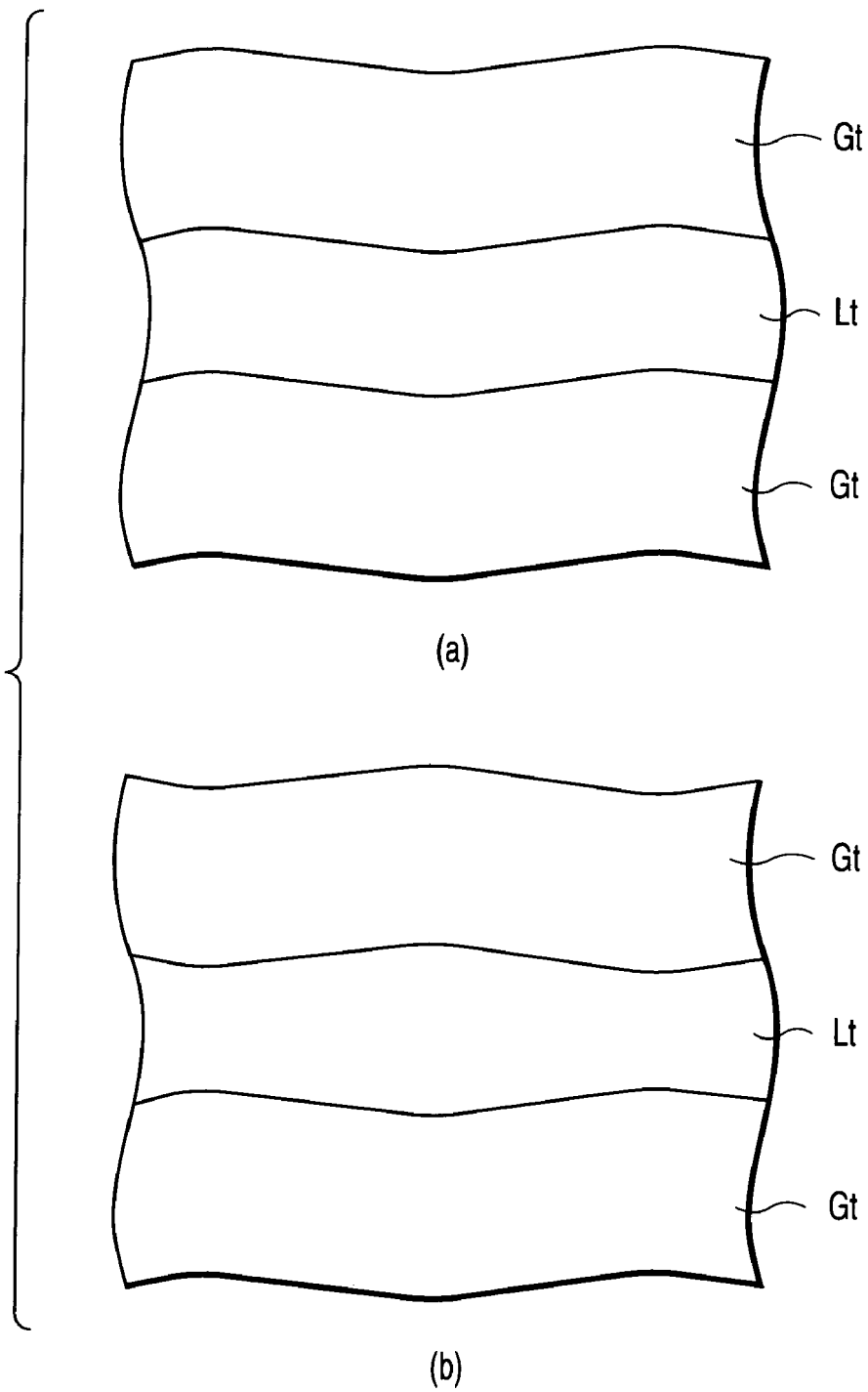
FIG. 9 is a view for explaining a wobble of a groove track in the write-once optical disk.

As described above, the groove track Gt is wobbled in order to record a variety of address information. Reference numeral (a) of FIG. 9 shows a case in which the adjacent groove tracks Gt are in an identical phase, and reference numeral (b) of FIG. 9 shows a case in which the adjacent groove tracks Gt are in a reversed phase. Depending on a region of the write-once optical disk 28, the adjacent groove tracks Gt have a variety of phase differences.

Now, generation of the above-described organic coloring matter solution 23 will be described here. As this organic coloring matter solution 23, there is used a solution having a solution concentration of 1.2% obtained by dissolving organic coloring matter powders of 1.2 g % by weight in a 100 ml TFP. A solution condition for a solvent is such that the coloring matter powers are put in the solvent, and the resultant solution is subjected to ultrasonic waves for 30 minutes.

As organic coloring matters, in addition to four types of coloring matters A to D described previously, seven types of mixed color matters F to L are produced by mixing two or more of these coloring matters.

Mixed color matter F is produced by adding 5% of coloring matter B to coloring matter D, namely, by mixing coloring matter B with coloring matter D at a ratio of 0.05 g to 1 g.

Mixed color matter G is produced by mixing a monomethine cyanine coloring matter (azo metal complex 3 of the anion portion) serving as coloring matter E with coloring matter D at a ratio of 7:3 (=D:E), and further, adding 5% of coloring matter B, namely, mixing, at a ratio of 0.05 g to 1 g, coloring matter B with the coloring matter obtained by mixing coloring matters D and E at a ratio of 7:3.

Mixed color matter H is produced by mixing coloring matter A with coloring matter D at a ratio of 1:1 (=D:A).

Mixed color matter I is produced by adding 10% of coloring matter B to coloring matter D, namely, by mixing coloring matter B with coloring matter D at a ratio of 00.10 g to 1 g.

Mixed color matter J is produced by adding 15% of coloring matter B to coloring matter D, namely, by mixing coloring matter B with coloring matter D at a ratio of 0.15 g to 1 g.

Mixed color matter K is produced by adding an azo metal complex 1 of an anion portion to coloring matter D, increasing an anion rate such that coloring matter portion: anion portion is 1:1.5, and further, adding 15% of coloring matter B.

Mixed color matter L is produced by adding an azo metal complex 1 of an anion portion to coloring matter D; increasing an anion rate such that coloring matter portion: anion portion is 1:2.0, and further, adding 15% of coloring matter B.

Figure 10:
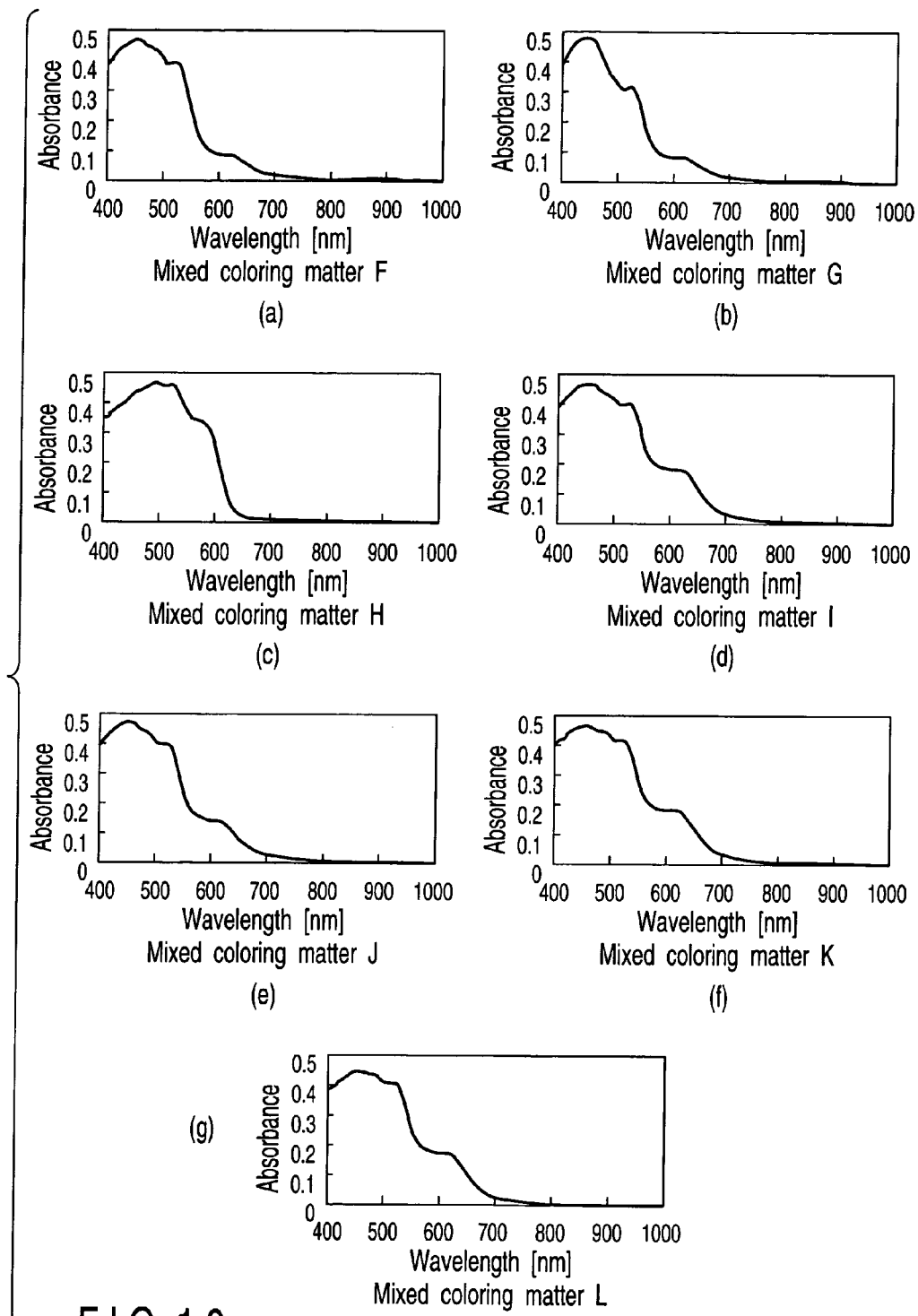
FIG. 10 is a characteristic view for explaining a change of absorbance relevant to a wavelength of a laser light with respect to other seven examples of the organic coloring matter material included in the recording layer.

Reference numerals (a) to (g) of FIG. 10 each show a change of absorbance of the emitted laser light relevant to a wavelength in the above-described coloring matters F to L. In any of the mixed color matters F to L as well, the maximum absorption wavelength region is shifted to a wavelength which is longer than a recording wavelength (405 nm), and the absorbance in recording wavelength (405 nm) exists in the vicinity of substantial 0.4.

By using 11 types of organic coloring matters A to D and F to L described above, a write-once disk 28 is produced in accordance with the above-described method, and recording and reproduction are carried out on these groove tracks Gt, thereby conducting an evaluation test. As an evaluation device, an optical disk evaluation device available from Pulse Tech Co., Ltd. is used.

A testing condition is such that: an object lens aperture NA of the optical head 29 is 0.65; a wavelength of a laser light for recording and reproduction is 405 nm; and a linear velocity during recording and reproduction is 6.61 m/sec. A recording signal is obtained as random data modulated in the range of 8 to 12. That is, as shown FIG. 11, the recording signal is obtained as a waveform recorded by constant recording power and two types of bias powers 1 and 2.

In addition, the track pitch is 400 nm, and the groove width Gw is "1.1" while the land width Lw is "1". A wobble amplitude of the groove track Gt is 14 nm, and the groove depth Gh is 90 nm. Wobble phase modulation is used to record wobbling address information.

Here, the evaluation features include a measurement result of each of three types, i.e., a carrier to noise ratio CNR of a reproduction signal; an SN ratio PRSNR (partial response signal to noise ratio) during partial response; and a simulated bit error rate (SbER). A definition and measuring techniques of PRSNR are described in a book available from DVD Format Logo Licensing Co., Ltd. for example, Annex H of Version 0.9, PART 1 Physical Specifications, DVD Specifications for High Density Read-Only Disk. It is preferable that PRSNR is 15 or more. A definition and measuring techniques of SbER are described in a book available from DVD Format Logo Licensing Co., Ltd. for example, Annex H of Version 0.9, PART 1 Physical Specifications, DVD Specifications for High Density Read-Only Disk. It is preferable that SbER is $5.0 \times 10^{-5}$ or less. PRSNR and SbER are measured in a state in which information has been recorded in the adjacent tracks.

Figures 11, 12:
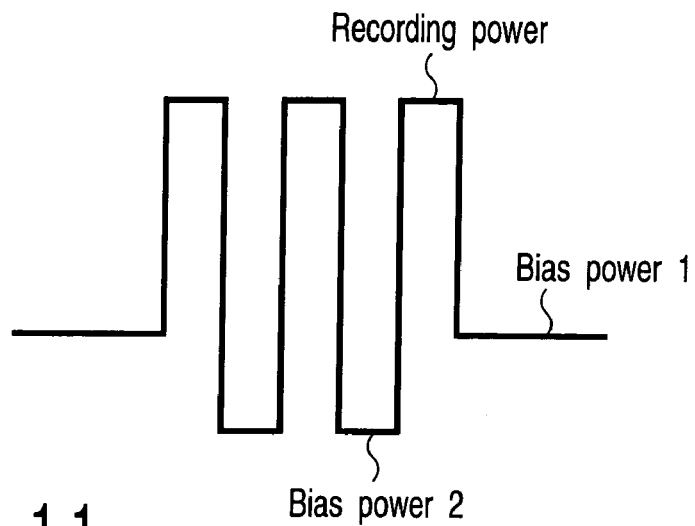
FIG. 11 is a waveform chart showing an example of a signal to be recorded to carry out an evaluation test of a recording and reproduction evaluation in the write-once optical disk.
FIG. 12 is a view for explaining a measurement result obtained by carrying out an evaluation test of a write-once optical disk with respect to eleven examples of the organic coloring matter material.

FIG. 12 shows a measurement result of each of the write-once optical disks 28 using coloring matters A to D and F to L. Judging from the measurement result shown in FIG. 12, it is found that a measurement result of CNR, PRSNR, and SbER is not sufficient in each of the write-once optical disks 28 using coloring matters B and C.

In contrast, a good measurement result is obtained in each of the write-once optical disks 28 using coloring matters A, D, F, G, H, I, J, K, and L. Although a measurement result of the write-once optical disk 28 using coloring matter A is also good, a measurement result of the write-once optical disk 28 using coloring matter D is good in particular. Further, the measurement result of each of the write-once optical disks 28 using coloring matters F, I, J, K, and L is excellent.

Next, a test for evaluating a degree of degradation due to repetition reproduction is conducted for each of the write-once optical disks 28 using coloring matters D, F, G, H, I, J, K, and L, a measurement result of which has been good. That is, 10,000 reproductions are carried out at a reproduction laser power of 0.8 mW, and the degrees of degradation of PRSNR and SbER are measured.

Figures 13, 14:
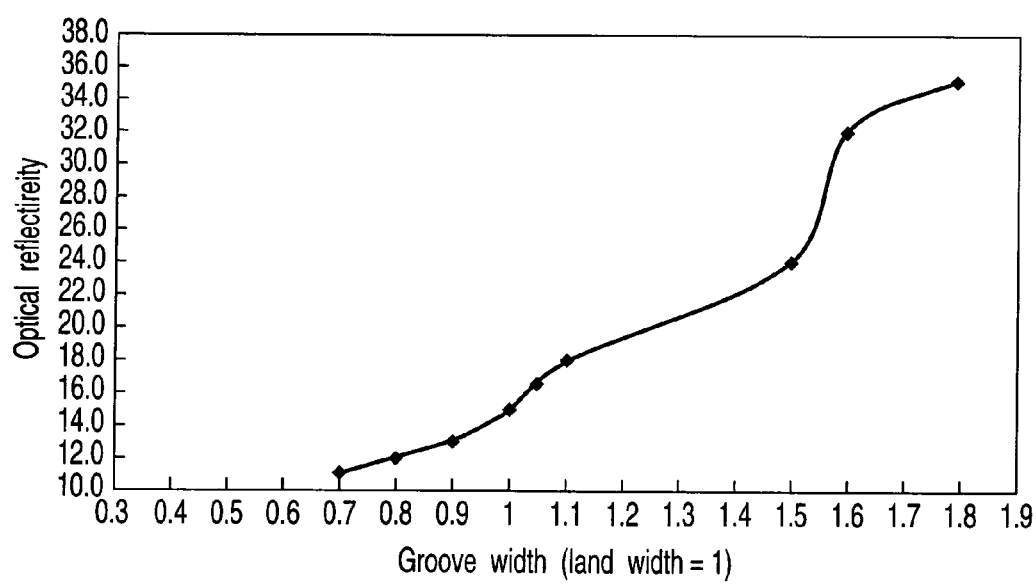
FIG. 13 is a view for explaining a measurement result obtained by carrying out a reproduction durability test of a write-once optical disk with respect to eight examples of the organic coloring matter material.
FIG. 14 is a characteristic view for explaining a relationship between a groove width and a light reflectivity of the write-once optical disk.

FIG. 13 shows a measurement result of each of the write-once optical disks 28 using coloring matters D, F, G, H, I, J, K, and L. It is found that the measurement result of each of PRSNR and SbER is not good in the write-once optical disk 28 using coloring matter G. The measurement result of each of the write-once optical disks 28 using coloring matters F, H, I, J, K, and L are good as compared with those of the write-once optical disk 28 using coloring matter D.

Among them, in particular, the measurement result of each of the write-once optical disks 28 using coloring matters J, K, and L is good, and the measurement result of the additional type optical disk 28 using coloring matter L is the best.

As has been described above, it is found that a material having a styryl coloring matter or a monomethine cyanine coloring matter in a coloring matter portion and having an azo metal complex in an anion portion is good as an organic coloring matter material used for the recording film 24.

In addition, it is found that a mixture of the styryl coloring matter and the monomethine cyanine coloring matter is good. Further, it is found that a material having a nickel metal complex added thereto is excellent. Furthermore, it is found that increasing a mixture ratio of the azo metal complex in the anion portion results in excellent reproduction light durability.

Next, a disk stamper 19 is produced by changing the groove width in the range of "0.7 to 1.8" while the land width Lw is "1". By using the disk stamper 19, the write-once optical disk 28 using coloring matter J is produced, and recording and reproduction are carried out for the groove track Gt, thereby conducting an evaluation test.

The evaluation features include a measurement result of each of three types, i.e., light reflectivity, SbER, and PRSNR.

A definition and measuring techniques of light reflectivity are described in a book available from DVD Format Logo Licensing Co., Ltd. for example, Annex D of Version 0.9, PART 1 Physical Specifications, DVD Specifications for High Density Read-Only Disk. The reflectivity is preferably 14% or more, more preferably in the range of 16% to 32%, and still more preferably 28% or less.

Figure 15:
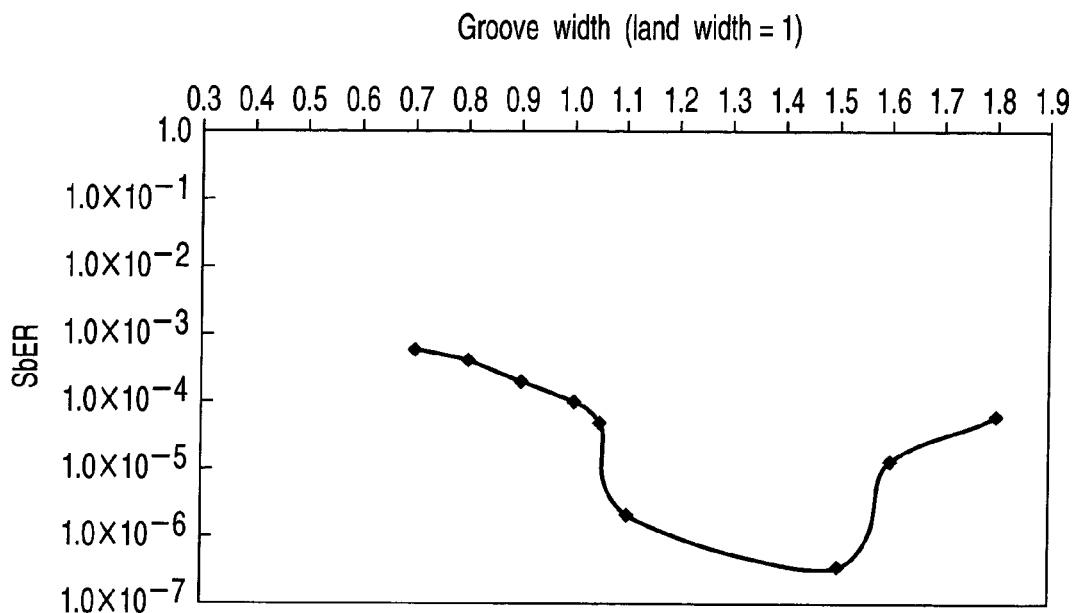
FIG. 15 is a characteristic view for explaining a relationship between a groove width and a simulated bit error rate of the write-once optical disk.
Figure 16:
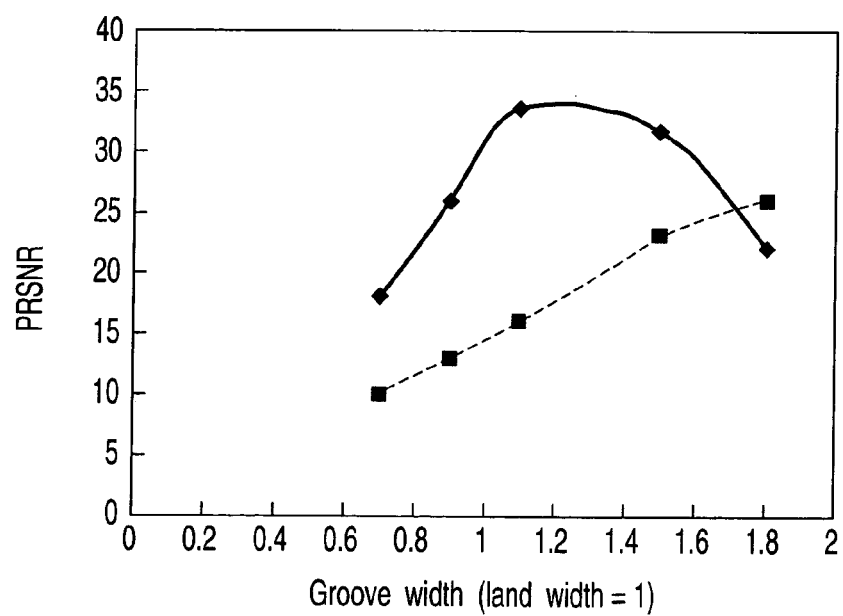
FIG. 16 is a characteristic view for explaining a relationship between a groove width and an S/N ratio during a partial response of the additional type optical disk.

FIG. 14 shows a measurement result of the light reflectivity with respect to the groove width Gw. FIG. 15 shows a measurement result of SbER with respect to the groove width Gw. FIG. 16 shows a measurement result of PRSNR with respect to the groove width Gw. In the measurement result of PRSNR shown in FIG. 16, the solid line indicates a state in which information has been recorded in the adjacent tracks, and the dotted line indicates a state in which no information is recorded in the adjacent tracks.

Here, it is desirable that the light reflectivity is preferably substantially 16.0% or more. More preferably, the light reflectivity is in the range of 18.0% to 32.0%, and still more preferably, the light reflectivity is 28.0% or less. It is preferable that SbER is $5.0 \times 10^{-5}$ or less. It is preferable that PRSNR is 15 or more.

When these conditions are applied to FIGS. 14 to 16, it is found that, in the case where the land width Lw is "1", the groove width Gw is within the range of "1.05 to 1.5", thereby obtaining good features.

Also, FIGS. 14 to 16 each show features in the case where the groove width Gw has been changed with respect to the write-once optical disk 28 using coloring matter J. With respect to each of the write-once optical disks 28 using other coloring matters D, F, G, H, I, K, and L as well, a measurement result of each of the light reflectivity, SbER, and PRSNR in the case where the groove width Gw has been changed is obtained to be good when the groove width Gw is in the range of "1.05 to 1.5" while the land width Lw is "1".

Further, in the case where a predetermined part of a disk, for example, management information (system lead-in) is inserted in the most internal periphery region, this Low-to-High recording disk can attain the most advantageous effect. As the management information, a pit array is formed on the disk substrate, the pit array being identical to a ROM disk substrate. As the pit array, there is recorded management information such as whether the disk type is a reproduction only type or a write once type; what scale of recording and reproduction wavelength is; whether the disk is a Low-to-High disk or a High-to-Low disk; what capacity of recording data is; and the like. Although a track pitch of the recording data region groove is selected as 400 nm or in the range of 320 nm to 300 nm, it is preferable that a track pitch of the pit array in this management information region is formed to be wider than that of the recording data region groove, and a data bit pitch of the pit is formed to be greater than that of the recording data region, because reproduction can be easily carried out, and the management information can be easily discriminated.

Figure 17:
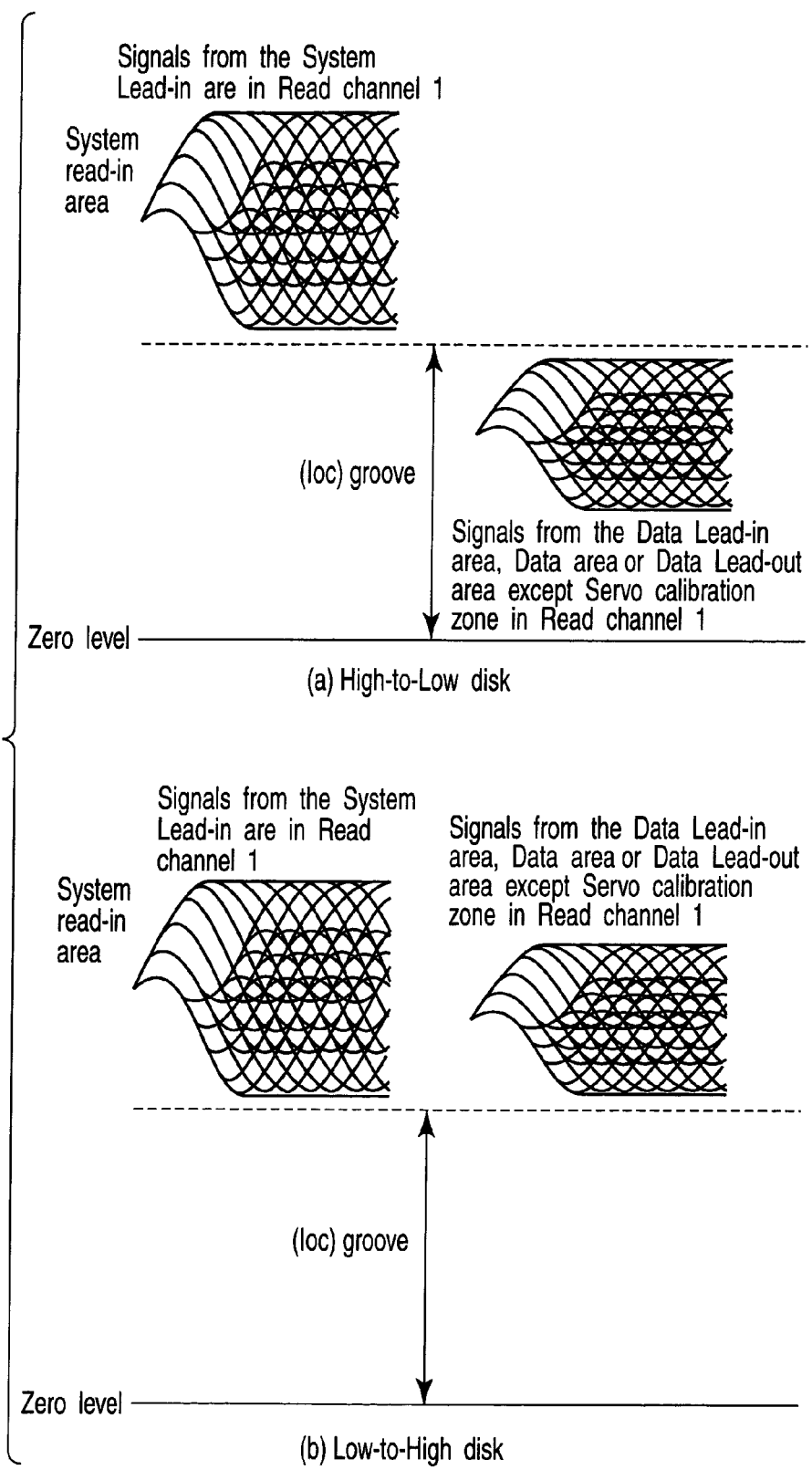
FIG. 17 is a view for explaining a reproduction signal wavelength between a High-to-Low disk and a Low-to-High disk.

Reference numeral (a) of FIG. 17 shows a reproduction signal waveform in a system lead-in region of a High-to-Low recording disk and a reproduction signal waveform obtained after data has been recorded in a recording data region (region in which a groove is formed). Reference numeral (b) of FIG. 17 shows a reproduction signal waveform in a system lead-in region of a Low-to-High recording disk and a reproduction signal waveform obtained after data has been recorded in a recording data region (region in which a groove is formed). As is evident from comparison between both of these disks, it is found that the Low-to-High disk is more stable at a signal level position between the system lead-in region and the data region, and drive reproduction is easily carried out.

Figure 18:
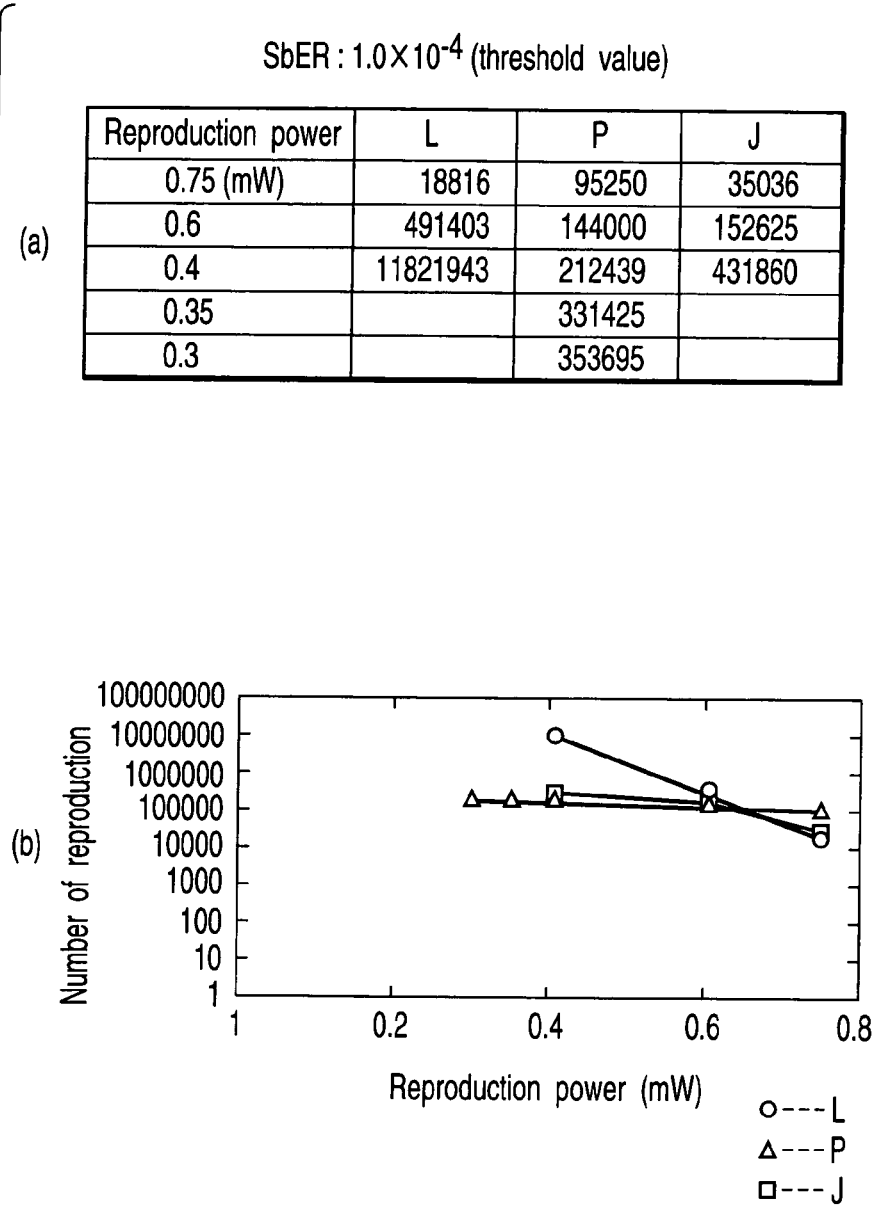
FIG. 18 is a view for explaining a measurement result obtained by carrying out a reproduction test of a write-once optical disk with respect to three examples of the organic coloring matter material.

Reference numerals (a), (b) of FIG. 18 each show a measurement result of reproduction count relevant to reproduction power with respect to three types of write-once optical disks produced by using coloring matters J and K described above and coloring matter P obtained by using a single azo metal complex as an organic metal complex. In this case, the reproduction count assumes that SbER is $1.0 \times 10^{-4}$ or less.

As coloring matter P, in chemical formula 1, there is used a coloring matter having Cu defined for M, CH3 defined for R1 to R3, and Cl defined for R4 and R5.

chemical formula 1:

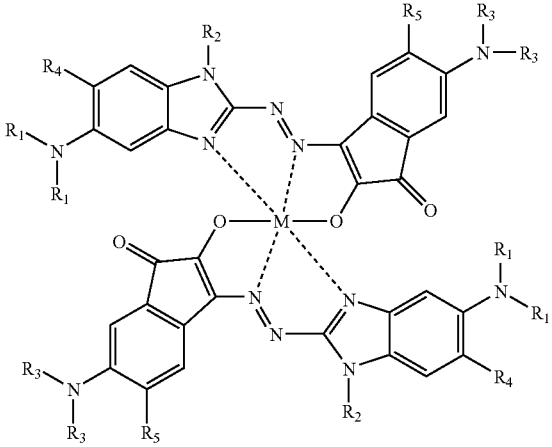

For example
M: Cu, Zn, Ni
$R_1, R_2, R_3, R_4, R_5$: $CH_3$, $CxHy$, H, Cl, F, $NO_2$, $SO_2NHCH_3$ Reference numerals (a), (b) of FIG. 19 each show a measurement result of reproduction count relevant to reproduction power with respect to each of the write-once optical disks produced by using coloring matters J, L, and P described above. In this case, the reproduction count assumes that SbER is $5.0 \times 10^{-5}$ or less.

Figure 19:
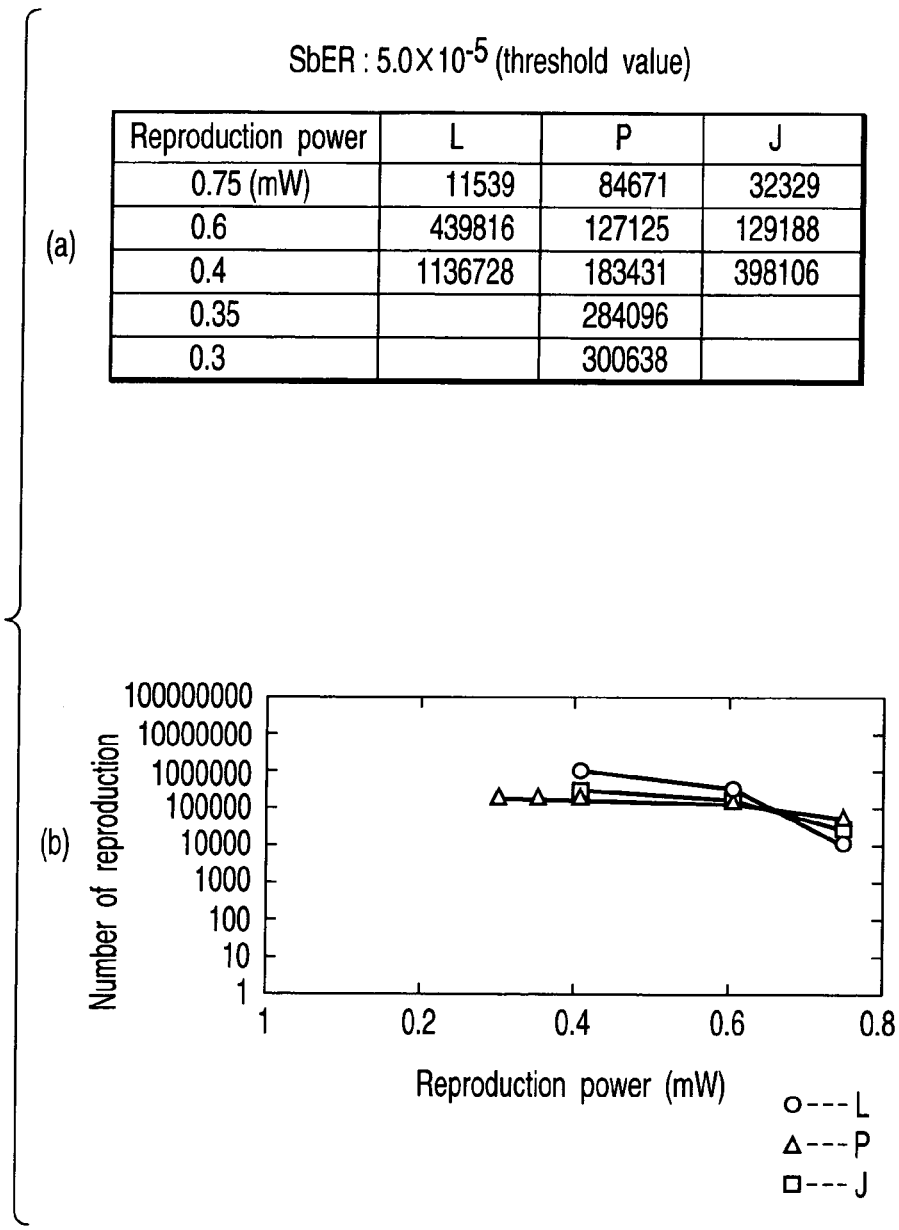
FIG. 19 is a view for explaining a measurement result obtained by carrying out another reproduction test of a write-once optical disk with respect to three examples of the organic coloring matter material.

As is evident from FIGS. 18 and 19, in any case as well, the write-once optical disk produced by using coloring matter L exhibits a good result in the vicinity of reproduction power of 0.4 mW.

Figure 20:
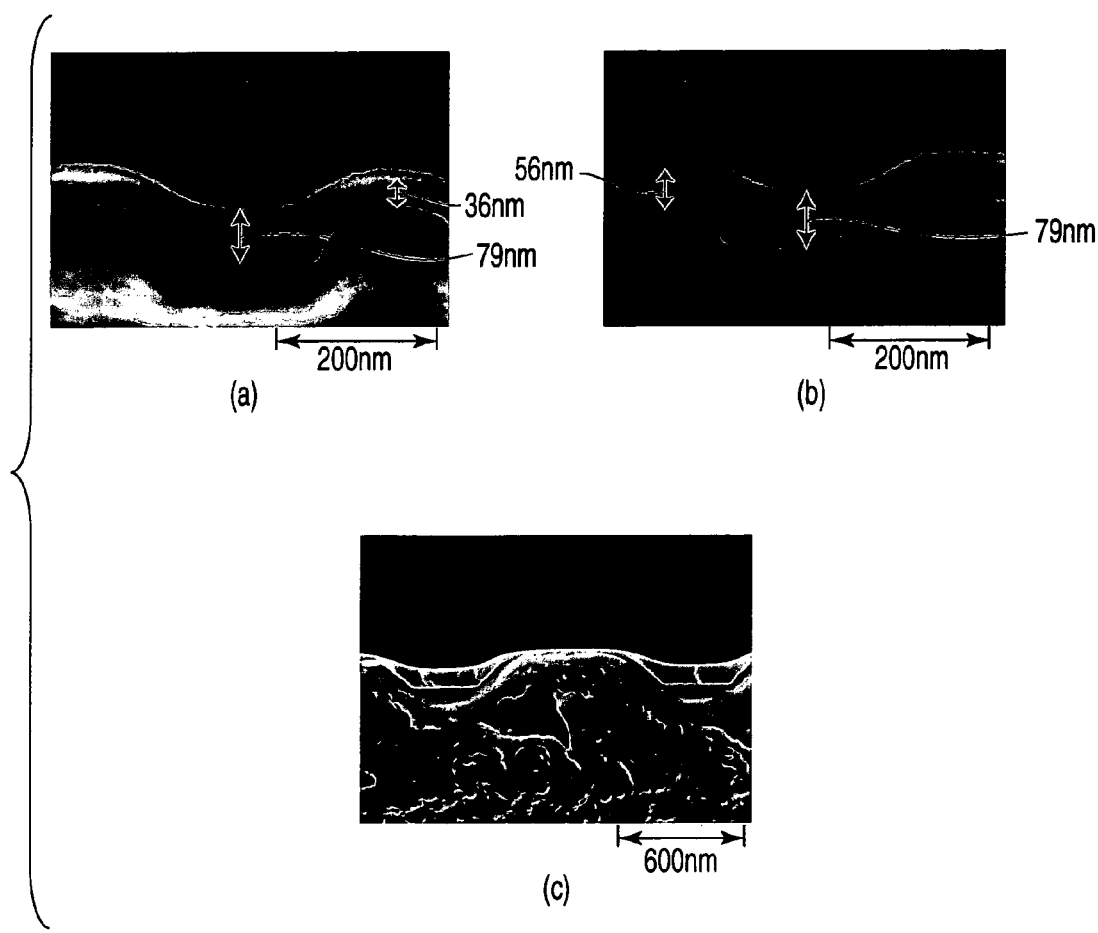
FIG. 20 is a microgram for explaining thickness of the recording film formed on the groove and the land of the write-once optical disk.

Here, in an example shown reference numeral (a) of in FIG. 20, the thickness of the recording film is set to 79 nm on the groove, and is set to 36 nm on the land. In an example shown in reference numeral (b) of FIG. 20, the above thickness is set to 79 nm on the groove, and set to 56 nm on the land. In contrast, the thickness of a recording film in a conventional CD-R or DVD-R becomes very small as shown in reference numeral (c) of FIG. 20.

The recording film thickness on the groove is set in the range of 50 nm to 120 nm, and set in the range of 20 nm to 70 nm, thereby making it possible to remarkably improve RPSNR, SbER, wobble cross talk, or radial deviation. In addition, a good result can be obtained by setting a ratio of the recording film thickness on the groove to the recording film thickness on the land to 1.3 to 3. Further, it is effective to set the groove width and the groove depth in the range of 220 nm to 270 nm and in the range of 50 nm to 80 nm, respectively.

Figure 21:
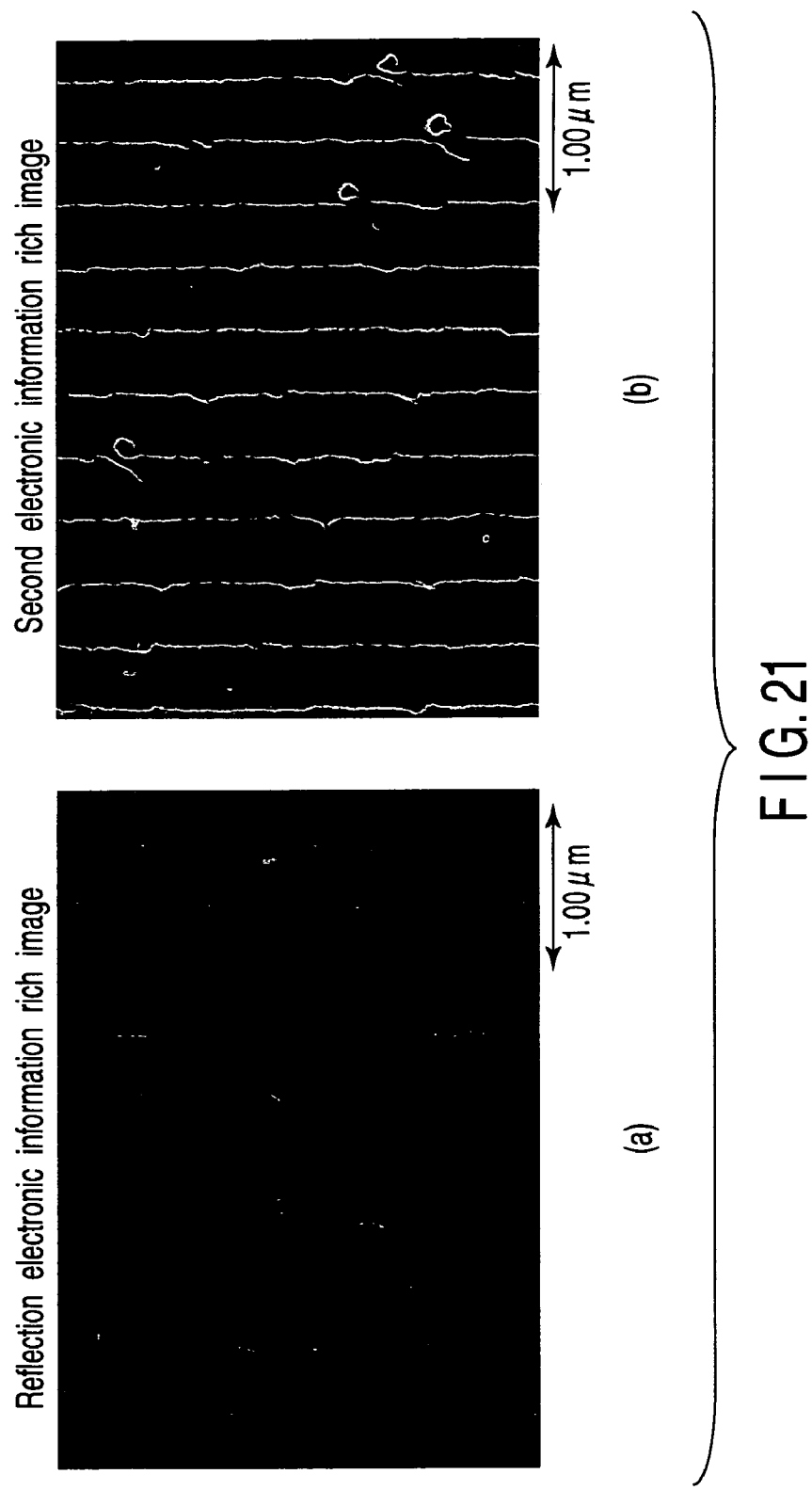
FIG. 21 is a microgram for explaining a recording mark formed on the recording layer of the write-once optical disk.

In addition, by using the coloring matters described in the embodiment, as shown in reference numerals (a), (b) of FIG. 21, a recording mark without any irregularity change is formed on the recording film of the write-once optical disk. Conventionally, there has been a recording system formed in an irregular shape for deforming a substrate such as a punching system.

The present invention is not limited to the above-described embodiments. At the stage of implementation, various modifications of constituent elements can occur without departing the spirit of the invention. In addition, a variety of inventions can be formed by properly combining a plurality of constituent elements disclosed in the above embodiment. For example, some of all the constituent elements disclosed in the embodiments may be eliminated. Further, the constituent elements according to the different embodiments may be properly combined with each other.

What is claimed is:

1. A write-once information recording medium comprising:
a transparent resin substrate having a concentrically or spirally shaped groove and a land formed thereon; and
a recording film formed on the groove and the land of the transparent resin substrate,
wherein the groove has a width ranging from 1.05 to 1.5 when the land has a width of 1, and
the recording film has a recording mark formed thereon by emission of short wavelength laser light whose wavelength is about 405 nm, a light reflectivity of the recording mark formed by the emission of the short wavelength laser light being higher than a light reflectivity of the recording film on which no recording mark is formed by emission of short wavelength laser light, and wherein the recording film has an absorbance in a range of about 0.3 to 0.5 while in a recording wavelength range of about 405 nm, wherein
the recording film includes an organic coloring matter whose maximum absorption wavelength region exists on a wavelength side which is longer than a wavelength of the short wavelength laser light;
the organic coloring matter has a coloring matter portion which is made of a coloring matter represented by general formula 3 and has an anion portion that is a mixed color matter of a first coloring matter which is made of an organic metal complex that is mainly composed of metal such as cobalt and represented by general formula 4 and a second coloring matter which is made of $C_{38}H_{32}N_{14}NiO_8$ and is represented by chemical formula 1:

chemical formula 1:

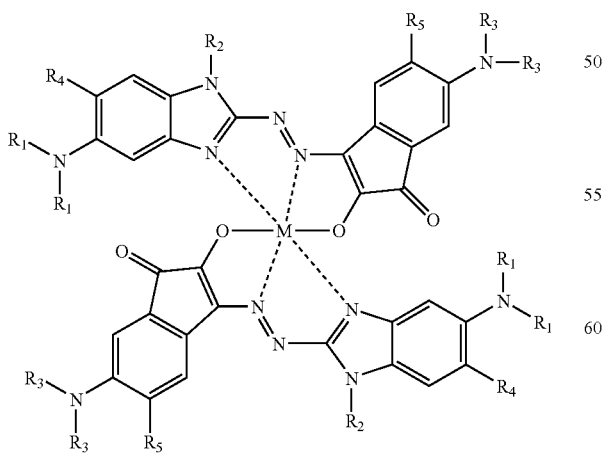

wherein exactly one of $R_1$-$R_5$ is $NO_2$ and M is Ni

General Formula 3:

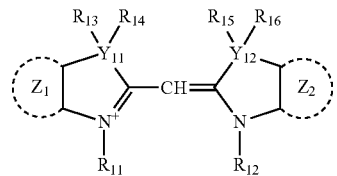

in general formula 3, Z1 and Z2 represent mutually same or different aromatic rings, and these aromatic rings each may have a substituent; Y11 and T12 each represent a carbon atom or a hetero atom, independently; R11 and R12 represent aliphatic hydrocarbon groups, and these aliphatic hydrocarbon groups each may have a substituent; and R13, R14, R15, and R16 each represent a hydrogen atom or a proper substituent, independently, and when Y11 and T12 are hetero atoms, part or all of R13, R14, R15, and R16 are absent, and General Formula 4:

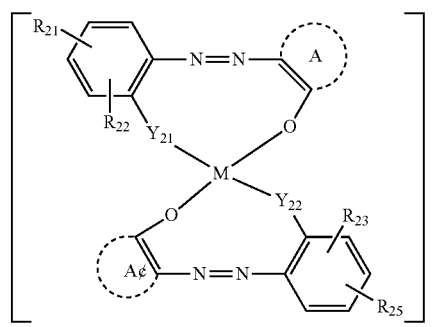

in general formula 4, M represents cobalt; A and A' represent mutually same or different complex ring groups of five rings to ten rings, containing one or more hetero atoms selected from a nitrogen atom, an oxygen atom, a sulfur atom, a selenium atom, and a tellurium atom, such as a furyl group, a thienyl group, a pyridyl group, a piperidino group, a piperidyl group, a quinolyl group, and an iso-oxazolyl group; Y21 and Y22 are mutually same or different hetero atoms selected from the elements of group XVI in the periodic table, such as an oxygen atom, a sulfur atom, a selenium atom, and a tellurium atom; R21 to R24 each represents a hydrogen atom, or halogen groups such as a fluoro group, a chloro group, a bromo group and an iodo group, or aliphatic hydrocarbon groups such as a methyl group, a trifluoromethyl group, an ethyl group, a propyl group, an isopropyl group, a butyl group, an isobutyl group, a sec-butyl group, a tert-butyl group, a pentyl group, an isopentyl group, a neopentyl group, a tert-pentyl group, a 1-methyl pentyl group, a 2-methyl pentyl group, a hexyl group, an isohexyl group and a 5-methyl hexyl group, or alicyclic hydrocarbon groups such as a cyclopropyl group, a cyclobutyl group, a cyclopentyl group, a cyclohexyl group and a 1-cyclohexenyl group, or an ether group, or a carbonyl group, or an acetoxy group, or an ester group, or an alkyl sulfamoyl group, or a sulfoamino group, or a cyano group, or a nitro group; and an azo compound is prepared by reaction between a diazonium salt having R21, R22, or R23, R24 corresponding to the general formula, and a complex ring compound having an active methylene group adjacent to a carboxyl group in the molecule, for example, an iso-oxazolone compound, an oxazolone compound, a thionaphthene compound, a pyrazolone compound, a barbituric acid compound, a hydantoin compound, and a rhodanine compound.

2. An organic coloring matter material used for a write-once information recording medium comprising:

a transparent resin substrate having a concentrically or spirally shaped groove and a land formed thereon;

a recording film formed on the groove and the land of the transparent resin substrate and having a recording mark formed thereon by emission of short wavelength laser light whose wavelength is about 405 nm, and wherein the recording film has an absorbance in a range of about 0.3 to 0.5 while in a recording wavelength range of about 405 nm; and a metal reflection film formed on the recording film, wherein the organic coloring matter material which is partially or wholly composed of a coloring matter portion and an anion portion made of an organic metal complex, and a light reflectivity of the recording mark formed by the emission of the short wavelength laser light is higher than a light reflectivity of the recording film on which no recording mark is formed by emission of short wavelength laser light, wherein the organic coloring matter material has a coloring matter portion which is made of a coloring matter represented by general formula 3 and has an anion portion that is a mixed color matter of a first coloring matter which is made of an organic metal complex that is mainly composed of metal such as cobalt and represented by general formula 4 and a second coloring matter which is made of $C_{38}H_{32}N_{14}NiO_8$ and is represented by chemical formula 1:

chemical formula 1:

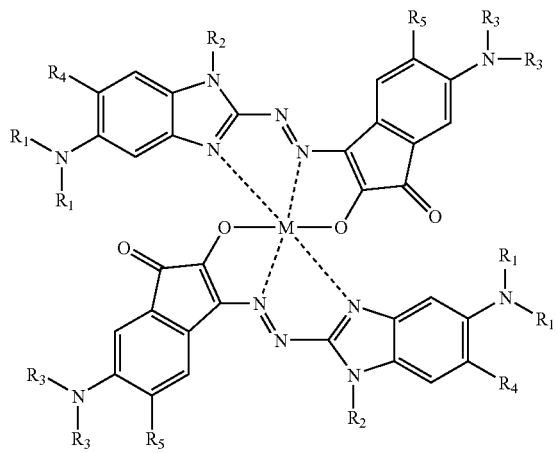

wherein exactly one of $R_1$-$R_5$ is $NO_2$ and M is Ni

General Formula 3:

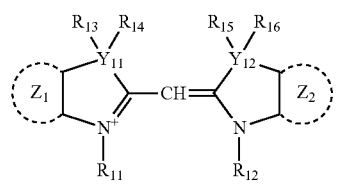

in general formula 3, Z1 and Z2 represent mutually same or different aromatic rings, and these aromatic rings each may have a substituent; Y11 and T12 each represent a carbon atom or a hetero atom, independently; R11 and R12 represent aliphatic hydrocarbon groups, and these aliphatic hydrocarbon groups each may have a substituent; and R13, R14, R15, and R16 each represent a hydrogen atom or a proper substituent, independently, and when Y11 and T12 are hetero atoms, part or all of R13, R14, R15, and R16 are absent, and General Formula 4:

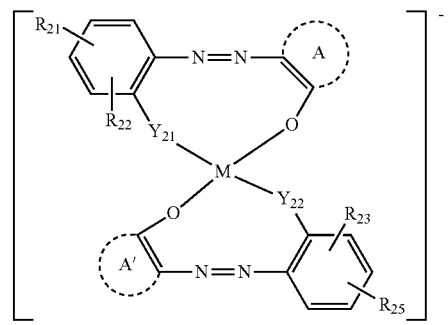

in general formula 4, M represents cobalt; A and A' represent mutually same or different complex ring groups of five rings to ten rings, containing one or more hetero atoms selected from a nitrogen atom, an oxygen atom, a sulfur atom, a selenium atom, and a tellurium atom, such as a furyl group, a thienyl group, a pyridyl group, a piperidino group, a piperidyl group, a quinolyl group, and an iso-oxazolyl group; Y21 and Y22 are mutually same or different hetero atoms selected from the elements of group XVI in the periodic table, such as an oxygen atom, a sulfur atom, a selenium atom, and a tellurium atom; R21 to R24 each represents a hydrogen atom, or halogen groups such as a fluoro group, a chloro group, a bromo group and an iodo group, or aliphatic hydrocarbon groups such as a methyl group, a trifluoromethyl group, an ethyl group, a propyl group, an iso-propyl group, a butyl group, an isobutyl group, a sec-butyl group, a tert-butyl group, a pentyl group, an isopentyl group, a neopentyl group, a tert-pentyl group, a 1-methyl pentyl group, a 2-methyl pentyl group, a hexyl group, an isohexyl group and a 5-methyl hexyl group, or alicyclic hydrocarbon groups such as a cyclopropyl group, a cyclobutyl group, a cyclopentyl group, a cyclohexyl group and a 1-cyclohexenyl group, or an ether group, or a carbonyl group, or an acetoxy group, or an ester group, or an alkyl sulfamoyl group, or a sulfoamino group, or a cyano group, or a nitro group; and an azo compound is prepared by reaction between a diazonium salt having R21, R22, or R23, R24 corresponding to the general formula, and a complex ring compound having an active methylene group adjacent to a carboxyl group in the molecule, for example, an iso-oxazolone compound, an oxazolone compound, a thionaphthene compound, a pyrazolone compound, a barbituric acid compound, a hydantoin compound, and a rhodanine compound.

* * * * *